(12) United States Patent  (10) Patent No.: US 8,050,427 B2
Terada                    (45) Date of Patent:     Nov. 1, 2011

(54) DIGITAL MIXER AND DISPLAY CONTROL METHOD THEREFOR

(75) Inventor: Kotaro Terada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1219 days.

(21) Appl. No.: 11/394,030

(22) Filed: Mar. 29, 2006

(65) Prior Publication Data

US 2006/0222189 A1    Oct. 5, 2006

(30) Foreign Application Priority Data

Mar. 31, 2005 (JP) ................................ 2005-105504
Mar. 31, 2005 (JP) ................................ 2005-105505

(51) Int. Cl.
  *H04B 1/00* (2006.01)
(52) U.S. Cl. ........................... 381/119; 700/94; 345/440
(58) Field of Classification Search .................. 381/119; 700/94; 345/440
  See application file for complete search history.

(56) References Cited

U.S. PATENT DOCUMENTS

| | | |
|---|---|---|
| 5,940,521 A | 8/1999 | East et al. |
| 6,061,458 A * | 5/2000 | East et al. ................. 381/119 |
| 6,281,885 B1 * | 8/2001 | Eastty et al. .................. 345/173 |
| 6,583,801 B2 | 6/2003 | Eastty et al. |
| 7,483,541 B2 | 1/2009 | Hagiwara et al. |
| 2003/0059066 A1 | 3/2003 | Kohyama et al. |
| 2003/0144997 A1 | 7/2003 | Hugley |
| 2004/0184626 A1 * | 9/2004 | Hagiwara ..................... 381/119 |

FOREIGN PATENT DOCUMENTS

| | | |
|---|---|---|
| EP | 0 743 766 A2 | 11/1996 |
| EP | 1 460 786 A2 | 9/2004 |

(Continued)

OTHER PUBLICATIONS

Yamaha, PM5D Digital Mixing Console, PM5d/PM5D-RH Owner's Manual, Copyright 2004.*

(Continued)

*Primary Examiner* — Vivian Chin
*Assistant Examiner* — Paul Kim
(74) *Attorney, Agent, or Firm* — Morrison & Foerster LLP

(57) ABSTRACT

There are provided k operators to be used for performing parameter setting. A channel strip screen displays a plurality of parameters for each of selected k channels. In response to selection operation to select a desired one of the parameters displayed on the channel strip screen, a parameter window related to the selected parameter is opened on a display. The parameter window displays, for each of selected k channels, a parameter of a same type as the selected parameter. Each of the parameters displayed for the selected k channels is assignable to any one of the k operators. When selection operation to select any desired one of first-type parameters has been performed, the parameter window is opened immediately, but, when selection operation to select any desired one of second-type parameters while the desired second-type parameter is in a non-selected state, the selected desired second-type parameter is set to a selected state without the parameter window being opened and then the parameter window is opened in response to further selection operation of said desired second-type parameter having been set to the selected state. When the second-type parameters are set in the selected state with the parameter window not opened, each of the second-type operators in the selected state, displayed on the channel strip screen, is assigned to any one of the k operators.

21 Claims, 14 Drawing Sheets

FOREIGN PATENT DOCUMENTS

| | | |
|---|---|---|
| GB | 2 330 751 A | 4/1999 |
| JP | 07-297651 A | 11/1995 |
| JP | 2002-142286 A | 5/2002 |
| JP | 2003-102098 A | 4/2003 |
| WO | WO-99/37046 A1 | 7/1999 |

OTHER PUBLICATIONS

Behringer: "Operating Manual DDX3216 Version 1.1" 'Online! Nov. 2001, XP002296052 Retrieved from the Internet: <URL:http://www.behringer-download.com/DDX3216/DDX3216_ENG_Rev_B.pdf>> 'retrieved on Sep. 13, 2004! * p. 10, col. 1, paragraph 3* * p. 15 * * p. 17, cols. 1-2 *.

Roland Corporation. (1998). VS-1680 Owner's Manual, 107 pages.

TASCAM: TEAC Professional Division: "TASCAM DM-24 Digital Mixing Console" Online! Feb. 21, 2002, XP002296051 Retrieved from the Internet: URL:http://web.archive.org/web/20020221004457/http://www.tascam.de/en/docs/DM-24_Manual.pdf <URL:http://web.archive.org/web/20020221004457/http://www.tascam.de/en/docs/DM-24_Manual.pdf>> 'retrieved on Sep. 13, 2004! * p. 10 * * p. 14-p. 19 * * p. 30-p. 35 * * p. 58 *.

Yamaha Corporation. (2000). "Yamaha 01V Digital Mixing Console, Owner's Manual" by Yamaha Corporation, 303 pages.

\* cited by examiner

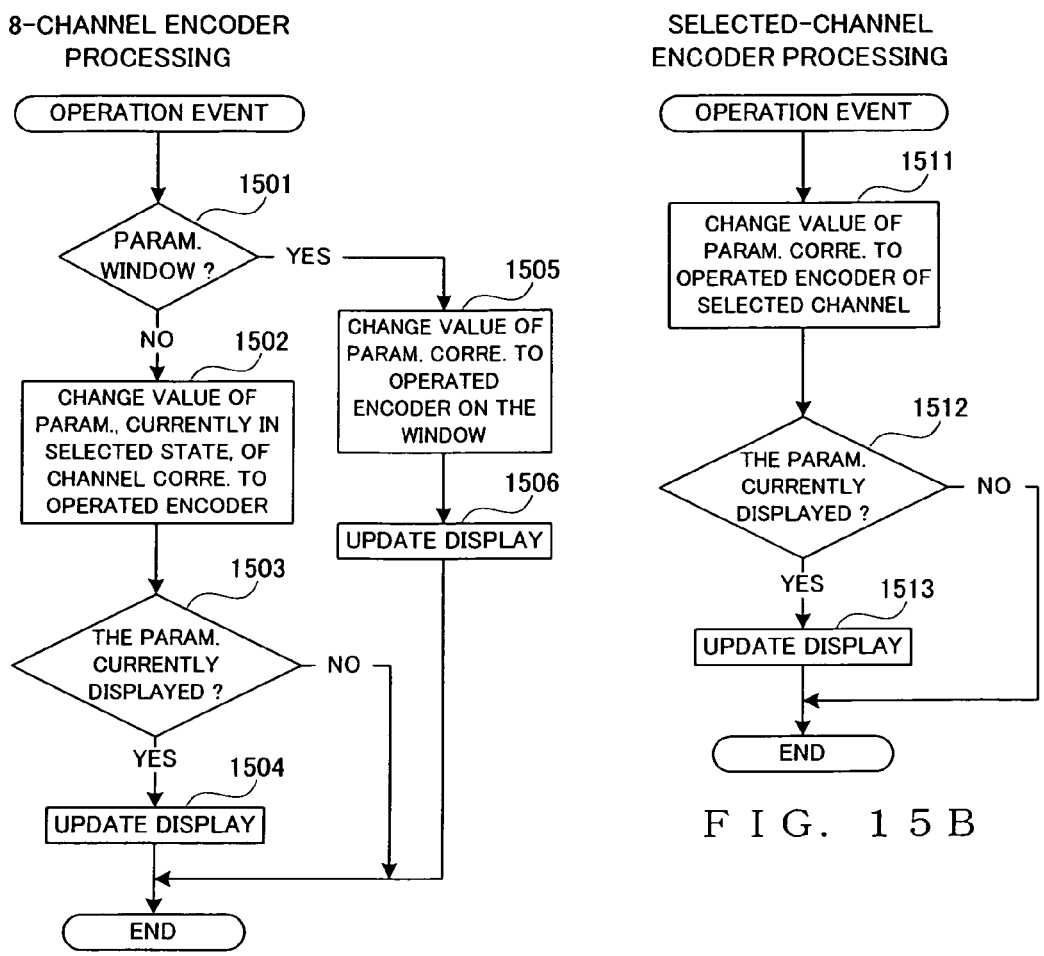
FIG. 15A
FIG. 15B
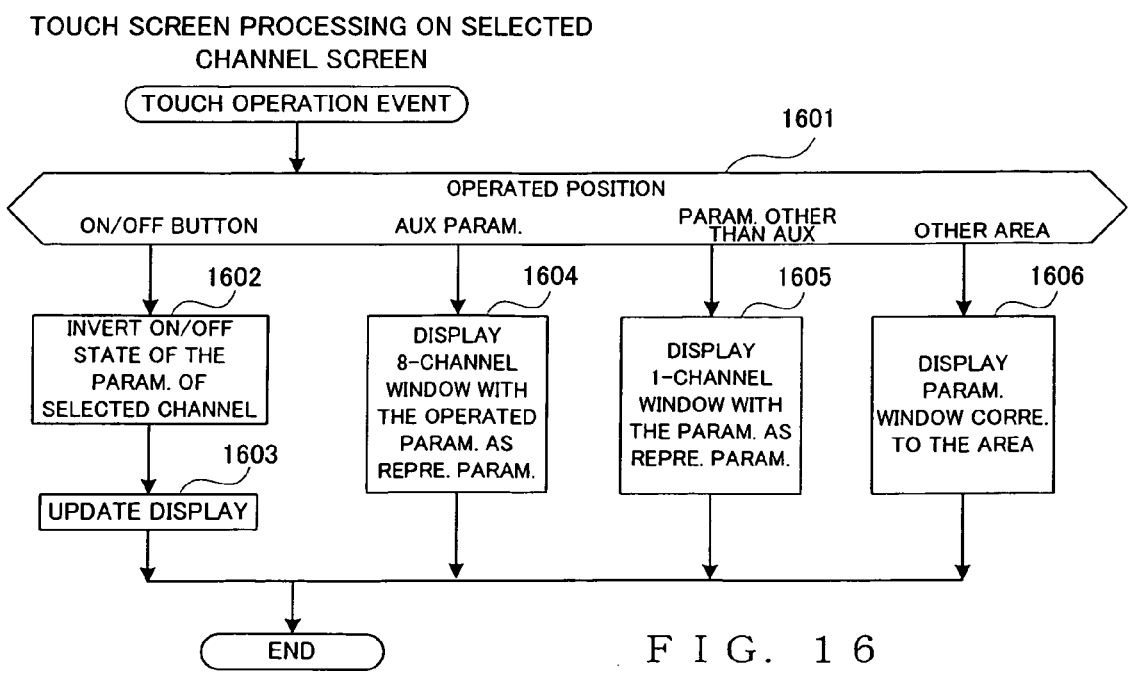
FIG. 16

DIGITAL MIXER AND DISPLAY CONTROL METHOD THEREFOR

BACKGROUND OF THE INVENTION

The present invention relates to digital mixers which receive input signals of a plurality of channels and perform various signal processing on the input signals to output the resultant processed signals.

There have known mixer apparatus which input audio signals from various audio signal sources, such as microphones, perform mixing processing, effect impartment processing, tone volume level control processing, etc. on the input audio signals and then output the resultant processed signals to various output equipment, such as amplifiers and speakers. In recent years, digital mixers have been developed, which perform internal signal processing through digital processing. The digital mixers include an operation panel where are provided with many operators operable by a human operator and displays. One example of the digital mixers is disclosed in "Instruction Manual of Digital Production Console DM2000" published by Yamaha Corporation.

On the display device of the digital mixers, there can be selectively displayed a screen (or parameter page) prepared, for each of various types of parameters, to make display settings of the parameter for a plurality of channels, or a screen (selected channel page) prepared, for each of the channels, to make display settings of a plurality of parameters for the channel. Also known are digital mixers where the display device is implemented by a touch-sensitive panel having a position sensor for detecting a position touched with a finger of a user or human operator. With the digital mixers provided with a touch-sensitive panel, the human operator can change a value of a desired parameter by touching a corresponding parameter operator, displayed on a display screen, with a finger and then moving the finger while still touching the corresponding parameter operator (i.e., drag operation).

SUMMARY OF THE INVENTION

The assignee of the instant application has proposed the following mixer in Japanese Patent Application No. 2005-76684 that has not yet been laid open at the time of the filing of the instant application. The proposed mixer includes channel selection operators for selecting any desired one of a plurality of channels, and group selection operators for selecting any desired one of a plurality of channel groups each comprising n (n is an integral number greater than one). On the operation panel of the proposed mixer, there are provided an assigned channel strip section disposed in front of the display device and comprises n assigned channel strips arranged horizontally (in a left-and-right direction of the panel) and each including operators operable to perform parameter setting for a particular channel, and a parameter operation (or manipulation) section that is disposed to the left of the display device and includes a plurality of assigning knob operators operable to perform parameter setting for a selected channel. In the proposed mixer, one of the channel groups is selected in response to operation of a corresponding one of the group selection operators, the n channels of the selected channel group are assigned to n assigned channel strips of the strip section, and a group screen indicating settings of a plurality of parameters for the n channels is displayed on the display device in such a manner that display areas of the plurality of parameters of the channels assigned to the assigned channel strips are located at positions immediately above the assigned channel strips. Further, a desired channel is selected in response to operation of a corresponding one of the channel selection operators, and a plurality of parameters of the selected channel are assigned to the assigning knob operators of the parameter operation section. Then, a parameter screen is displayed on the display device, where display elements of the knob operators are displayed, at positions corresponding to positions of the assigning knob operators of the parameter operation section, to indicate settings of the plurality of parameters of the selected channel by means of the display elements.

There has been a demand for a user-friendly (i.e., highly-operable) user interface for performing parameter value control suitable for such a mixer.

With such a mixer, the display device has to have a large-size screen when all parameters of the individual channels are to be displayed in the channel-specific parameter setting display areas of the group screen. One conceivable approach is to switchingly display the parameters without increasing the size of the display screen. In such a case, however, the human operator has to view the parameter values while ascertaining which parameters are currently displayed, which tends to lead to a poor operability. Therefore, switchingly displaying the parameters as noted above on the group screen is not preferable; it is preferable that the types of displayed contents for the individual channels be fixed.

Further, with the digital mixer provided with a touch-sensitive display screen, where the value of a given parameter is changed through drag operation, there would occur the inconveniences that it is difficult to accurately set the parameter to a desired value and the display screen tends to easily get dirty because fingers are rubbed against the screen. Thus, it is preferable that the parameter value change be made using separate parameter operators rather than the touch-sensitive display screen.

Further, although a same parameter can be manipulated on both the parameter page and the selected channel page according to the aforementioned conventional technique, it is not possible to readily perform parameter operation while alternately switching between the parameter page and the selected channel page. Thus, when operation for setting a parameter of a given channel while comparing the parameter with the same parameter of another channel and operation for manipulating or operating the parameter while referring to another parameter of the given channel are to be performed in an alternative manner, operation for selecting and manipulating a parameter screen switch of the parameter from among a plurality of parameter screen switches and operation for manipulating a switch to display a channel screen has to be performed alternately.

Further, parameters displayed on the group screen indicating parameter settings of a plurality of channels include parameters that tend to be manipulated at a relatively high frequency and parameters that tend to be manipulated at a relatively low frequency. It is desirable to reduce the necessary screen size of the display device by hiding images of parameters of a relatively low manipulation frequency.

In view of the foregoing, it is an object of the present invention to provide an improved digital mixer with a user-friendly user interface capable of readily performing parameter value control even where a display device has a limited screen size, which particularly achieves a high operability taking into account parameters having a relatively high manipulation frequency and parameters having a relatively low manipulation frequency.

It is another object of the present invention to provide an improved digital mixer with a user-friendly (i.e., highly-operable) user interface capable of readily performing parameter value control even where a display device has a limited screen size. Particularly, the present invention seeks to achieve a good operability of the digital mixer even when operation for setting a parameter of a given channel while comparing the parameter with the same parameter of another channel and operation for manipulating the parameter while referring to another parameter of the given channel are to be performed in an alternative manner. The present invention seeks to achieve a good operability by using a touch-sensitive display efficiently and minimize a possibility of the touch-sensitive display from getting dirty.

In order to accomplish the above-mentioned objects, the present invention provide a digital mixer including a plurality m of signal processing channels, which comprises: a display device capable of displaying graphics; k operators to be used for performing parameter setting, where k<m; a display control section that causes the display device to display a channel strip screen displaying a plurality of parameters for each of selected k channels; a window opening control section that, in response to selection operation to select a desired one of the parameters displayed on the channel strip screen, opens a parameter window related to the parameter selected via the selection operation, the parameter window displaying, for each of selected k channels, a parameter of the same type as the selected parameter, each of the parameters displayed for the selected k channels being assignable to any one of the k operators, wherein, when any one of first-type parameters has been selected, the parameter window is opened immediately, but, when any one of second-type parameters has been selected while it is in a non-selected state, the second-type parameter is set to a selected state without the parameter window being opened and then the parameter window is opened in response to further selection operation of the second-type parameter having been set to the selected state; an assignment section that, when the second-type parameters are in the selected state with the parameter window not opened, assigns each of the second-type operators in the selected state, displayed on the channel strip screen, to any one of the k operators; and a parameter control section that, in response to respective operation of the k operators, controls values of parameters assigned to the k operators.

If what has been selected is a first-type parameter, one operation of the first-type parameter can open a parameter window of the parameter, and various control and setting can be performed on the parameter using the parameter window. In this case, the parameter window has to be closed once, in order to switch the parameter to be controlled over to another parameter; however, a frequency with which the first-type parameter is selected is relatively low, and thus, a frequency with which the first-type parameter is selected also tends to be low. If what has been selected is a second-type parameter, on the other hand, one operation of the second-type parameter can switch the parameter to be assigned to the operator (parameter in the selected state) over to another parameter. Again performing selection operation of the same second-type parameter as necessary can open a parameter window. Namely, for the second-type parameter of a high frequency of use, one operation can immediately switch the parameter to be controlled/set with the corresponding operator.

The digital mixer of the present invention may further comprise a window-switching control section that, in accordance with a window switching instruction, closes a currently-opened parameter window and opens a parameter window of a designated other type. The parameter window of the designated other type parameter window include at least one of a one-channel window that displays, for a selected one of the channels, k or less parameters belonging to the same group as the selected desired parameter, each of the selected parameters being assignable to any one of predetermined k operators in the channel strip section, and an all-channel window that displays parameters for all of the channels.

Thus, when a k-channel parameter window is opened for a given parameter (representative parameter), a switchover can be made to a one-channel window or all-channel window for the parameter in response to a window switching instruction given by the window-switching control section. Also, a switchover can be made back to the k-channel parameter window of the parameter. Namely, the present invention can perform, with a high efficiency, detailed setting of the parameter focusing on a given parameter, setting of the parameter with sufficient consistency or substantial continuity from the k-channel strip screen and setting of the parameter viewing all of the channels, while switching among the windows.

According to another aspect of the present invention, there is provided a digital mixer including a plurality of signal processing channels, which comprises: a display device capable of displaying graphics; a plurality of operators to be used for performing parameter setting; an assignment section that assigns k channels, selected from among said plurality of channels, to the individual one of said operators; a display control section that causes the display device to display, as a base screen, (a) a selected channel screen displaying a plurality of parameters for a selected one of the channels and (b) a channel strip screen displaying a plurality of parameters for each of the selected k channels to be displayed as a base screen, in accordance with selection by a user; a window opening control section that opens any one of a plurality of types of parameter windows in response to selection operation to select a desired one of the parameters displayed on the base screen, the plurality of types of parameter windows including (a) a one-channel window that displays, for a selected one of the channels, k or less parameters belonging to the same group as the selected desired parameter, each of the k or less parameters being assignable to any one of said plurality of operators and (b) a k-channel window that displays, for each of selected k channels, a parameter of the same type as the selected desired parameter, each of the parameters for the k channels being assignable to any one of said plurality of operators; a window-switching control section that, in accordance with a window switching instruction, closes a currently-opened parameter window and opens a parameter window of a designated other type; and a parameter control section that, in response to respective operation of said plurality of operators, controls values of parameters assigned to the operated operator in accordance with a type of the parameter window being currently opened.

Preferable, said window opening control section may control the window opening so that, when the selected channel screen is being displayed as the base screen, the one-channel window is opened in response to the selection operation, but, when the channel strip screen is being displayed as the base screen, the k-channel window is opened in response to the selection operation.

Preferable, the display device may be a touched-position-detection type display device capable of detecting a touched position on a display screen thereof, and the selection operation is performed by touching operation, by the user, on any one of display areas for individual parameters on the base screen displayed on the display device.

According to the present invention, even when a parameter window has been opened in response to selection operation to select a parameter on any one of the selected channel screen and k-channel strip screen, switching can be made freely among the one-channel window, k-channel window and all-channel window of the selected parameter (i.e., "representative parameter"). Further, any one of various parameter windows is opened depending on the type of base window from which the parameter window is opened. Namely, when the base screen is the selected channel screen, the one-channel window of the representative parameter is opened, and, when the base screen is the channel strip screen, the k-channel window of the representative parameter is opened. Because any one of the one-channel window and k-channel window is selectively opened depending on the type of the base screen, the mixer can be operated with good operability in a consistent manner and thus can be used with ease. Particularly, even where operation for setting a given parameter of a given channel while comparing it with the same parameter of another channel and operation for operating or manipulating the given parameter while referring to another parameter of the given channel is performed alternately, the mixer can be operated with good operability.

Touch-sensitive display is used for performing operation to select a parameter, but not used for performing operation to change a parameter value. The parameter value change operation is performed via parameter operators provided separately from the touch-sensitive display. Namely, because there is no need to perform drag operation on the touch-sensitive display, the display surface does not easily get dirty.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIGS. 15A and 15B are flow charts of eight-channel encoder processing;

FIG. 16 is a flow chart of touch screen processing on the selected channel screen.

DETAILED DESCRIPTION OF THE INVENTION

Figure 1:
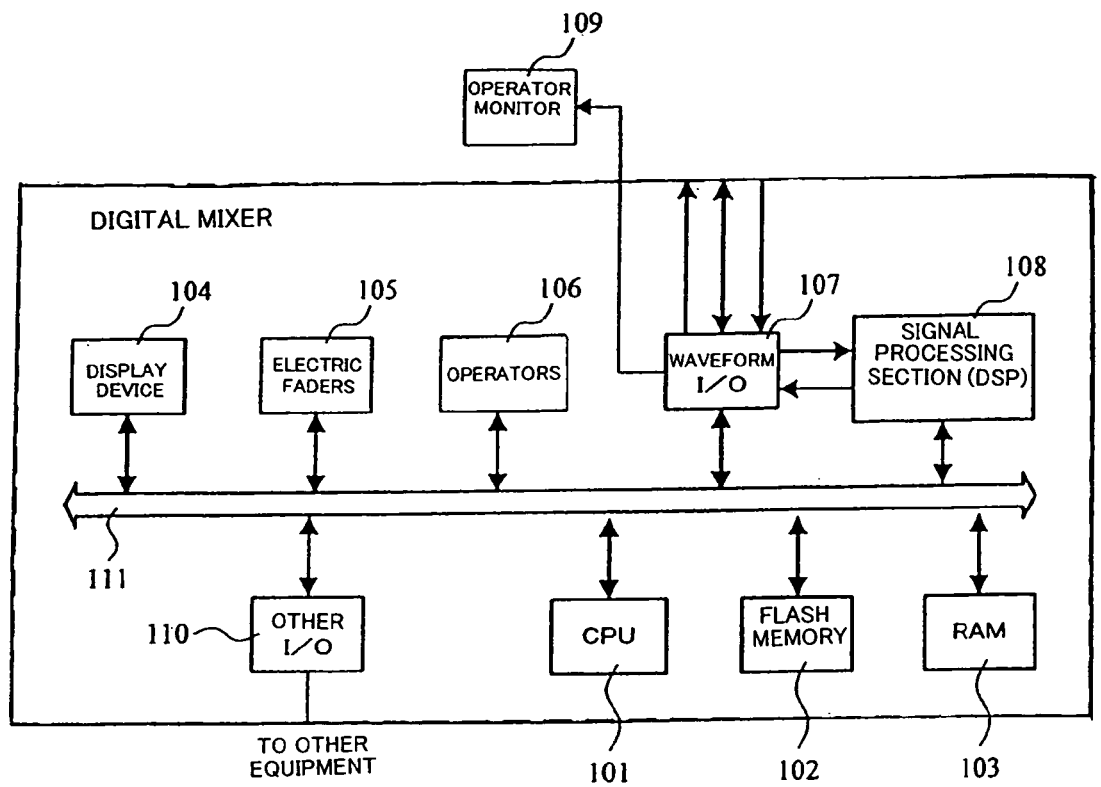
FIG. 1 is a block diagram showing an example hardware setup of a digital mixer in accordance with an embodiment of the present invention.

FIG. 1 is a block diagram showing an example hardware setup of a digital mixer in accordance with an embodiment of the present invention, which is provided with a novel audio control table (i.e., operation panel). The digital mixer comprises a central processing unit (CPU) 101, a flash memory 102, a random access memory (RAM) 103, a display device 104, electric faders 105, operators 106, a waveform input/output interface (I/O) 107, a signal processing section (DSP) 108, an operator monitor 109, another I/O 110, and a bus 111.

The CPU 101 is a processing device for controlling operation of the entire mixer. The flash memory 102 is a non-volatile memory having stored therein various programs for execution by the CPU 101, various data, etc. The RAM 103 is a volatile memory to be used as a loading area for a program to be executed by the CPU 101 and as a working area. The display device 104 is a visual display device provided on the operation panel of the mixer for displaying various information. The display device 104 is in the form of a touch-sensitive panel that can input each position touched with a finger of a human operator or the like. In accordance with an instruction given by the CPU 101, any one of the electric faders 105 can be set to a desired level, and a knob position of the fader 105 can be electrically moved to a position corresponding to the level setting. The operators 106 include various operators (other than the electric faders) provided on the operation panel and operable by the human operator. The waveform I/O 107 is an interface for communicating waveform signals between the digital mixer and external equipment. The DSP 108 performs various microprograms on the basis of instructions given by the CPU 101 to thereby perform mixing processing, effect impartment processing, tone volume level control processing, etc. on waveform signals input via the waveform I/O 107, and then it outputs the resultant processed waveform signals via the waveform I/O 107. The operator monitor 109 is provided by displaying outputs to monitoring headphones used by the human operator of the mixer. The other I/O 110 is an interface for connecting other equipment to the mixer.

Figure 2:
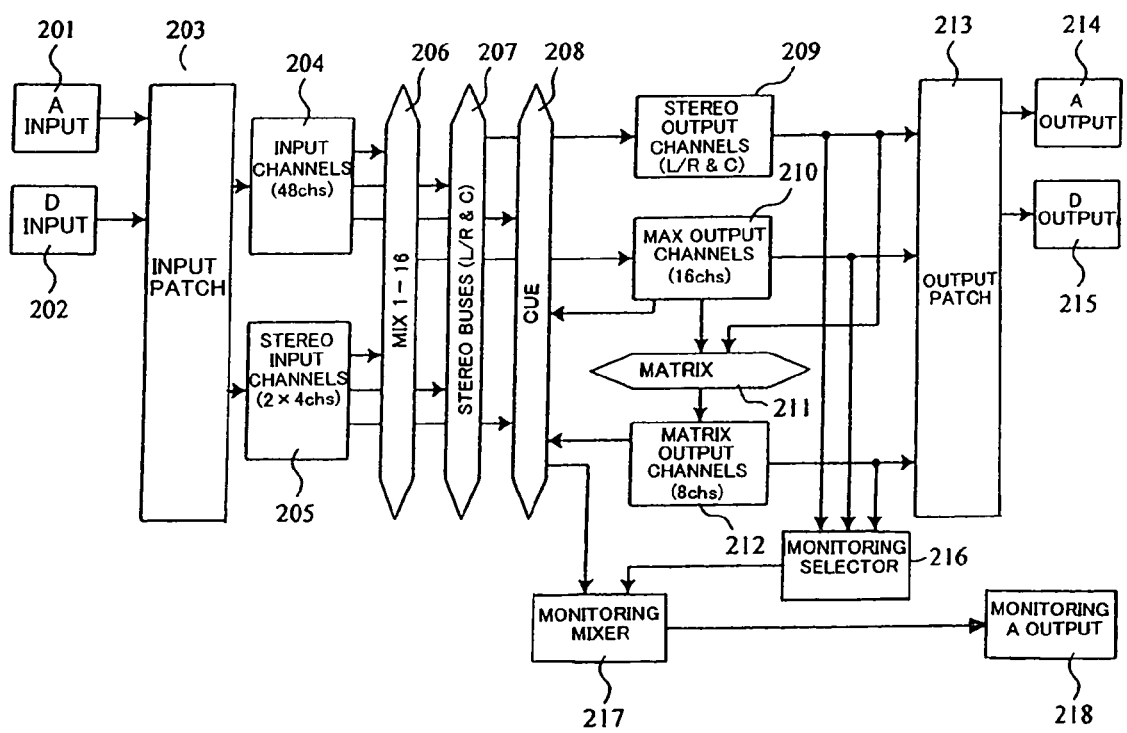
FIG. 2 is a functional block diagram showing functions of the mixer.

FIG. 2 is a functional block diagram of the digital mixer shown in FIG. 1. Reference numeral 201 indicates an analog audio signal input section ("A input") for converting each analog audio signal, input via a microphone or the like, into a digital signal. 202 indicates a digital audio signal input section ("D input section"). A plurality of input lines can be provide in each of these input sections 210 and 202; there are set upper limits to the respective numbers of the input lines, depending on the construction of the mixer apparatus. Input patch section 203 connects the input lines to desired input channels 204 and stereo input channels 205. Such connections of the input lines to the desired input channels 204 or input channels 205 may be set by the human operator or user while viewing a predetermined screen. The input channels 204 consist of a total of 48 channels. The stereo input channels 205 consist of four sets of stereo input channels (2×4 channels), and left (L) and right (R) signals of the individual sets are controlled in pairs.

Signal of each of the input channels 204 and stereo input channels 205 can be selectively output to any of 16 MIX buses 206, stereo buses (Stereo_L/R and C buses) 207 and CUE bus 208, and a send level (i.e., delivery level) of the signal can be set independently of the other signals.

Each of the 16 MIX buses 206 mixes signals input from the input channels 204 and stereo input channels 205. The thus-mixed signals are output to corresponding MIX output channels (1-16 channels). Channels of the MIX buses 206 and MIX output channels 210 correspond to each other in a one-to-one relationship. Outputs from the MIX output channels 210 are supplied to an output patch section 213. The stereo buses 207 mix signals input from the input channels 204 and stereo input channels 205. The thus-mixed stereo signals are output to stereo output channels 209. Note that the stereo buses 207 and stereo output channels 209 include, in addition to L and R signals lines (L bus, R bus and L and R output channels), C (central) signal lines (C bus and C output channels). For example, tones of a music piece are supplied in stereo to the L and R buses and output channels and then audibly produced or sounded through left and right speakers, while voices of a human speaker are supplied to the C bus and output channel and sounded through a center speaker. In the stereo output channels 209, L and R signals are controlled in a pair independently of the signal of the C output channel. Outputs from the stereo output channels 209 are supplied to the output patch section 213. The CUE bus 208 is a bus for ascertaining what kinds of signals are input to the individual channels. When a CUE switch of any one of the channels is turned on, a signal of that channel alone is input to a monitoring mixer 217 via the CUE bus 208.

Output signals from the stereo output channels 209 are supplied to the output patch section 213 and matrix bus 211. The matrix bus 211 is a bus of eight channels that selectively inputs desired channel outputs from stereo output channels 209 and MIX output channels 210. Signals mixed by the matrix bus 211 are output to matrix output channels 212. The channels of the matrix bus 211 correspond to the matrix output channels 212 in a one-to-one relationship. Outputs from the matrix output channels 212 are coupled to the output patch section 213 and CUE bus 208. The output patch section 213 connects the above-mentioned three types of output channels 209, 219 and 212 to desired output lines. Such connections of the output channels to the desired output lines may be set by the human operator while viewing a predetermined screen. "A output" 214 represents analog output lines, and "D output" 215 represents digital output lines. Monitoring selector 216, monitoring mixer 217 and monitoring "A output" 218 are provided for monitoring purposes.

Figure 3:
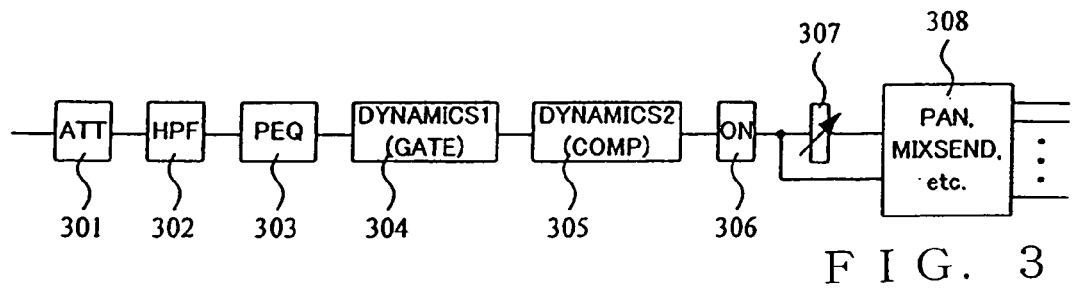
FIG. 3 is a block diagram schematically showing a signal processing construction of one channel.

FIG. 3 is a block diagram outlining a signal processing construction of one of the input channels 204 of FIG. 2. The input channel includes an attenuator (ATT) 301, a high-pass filter (HPF) 302, a parametric equalizer (PEQ) 304, a first dynamics (DYNAMICS1) section 304, a second dynamics (DYNAMICS2) section 305, an ON switch 306, a fader 307, and a panning/mixing level adjustment section 308.

The attenuator (ATT) 301 is a section for performing level control on the input signal at a head portion of the input channel. The HPF 302 and PEQ 303 are sections functioning to adjust frequency characteristics of the input signal. The dynamics sections 304 and 305 are each a section functioning to modify the amplitude of the input signal, such as a noise gate (that is closed when the signal level has decreased, to prevent noise from remaining) and compressor (that performs automatic gain adjustment of the input signal). The ON switch 306 is a switch for turning on/off the signal output from the channel. The fader 307 is a volume control for adjusting the signal level of the channel. The adjustment section 308 is a section that performs left/right localization (panning) when stereo signals are to be output to stereo buses and other buses, ON/OFF control of signals output to individual buses and individual send level adjustment of output signals to individual buses). Each of the stereo input channels 205 too is constructed in generally the same manner as illustrated in FIG. 3. However, in the stereo input channel 113, left (L) and right (R) signals are controlled in a pair. Further, each of the stereo output channels 209, MIX output channels 210 and matrix output channels 212 too is constructed in generally the same manner as illustrated in FIG. 3, although these channels 209, 210 and 212 are different from the channel of FIG. 3 in terms of functions of the signal processing components.

Figure 4:
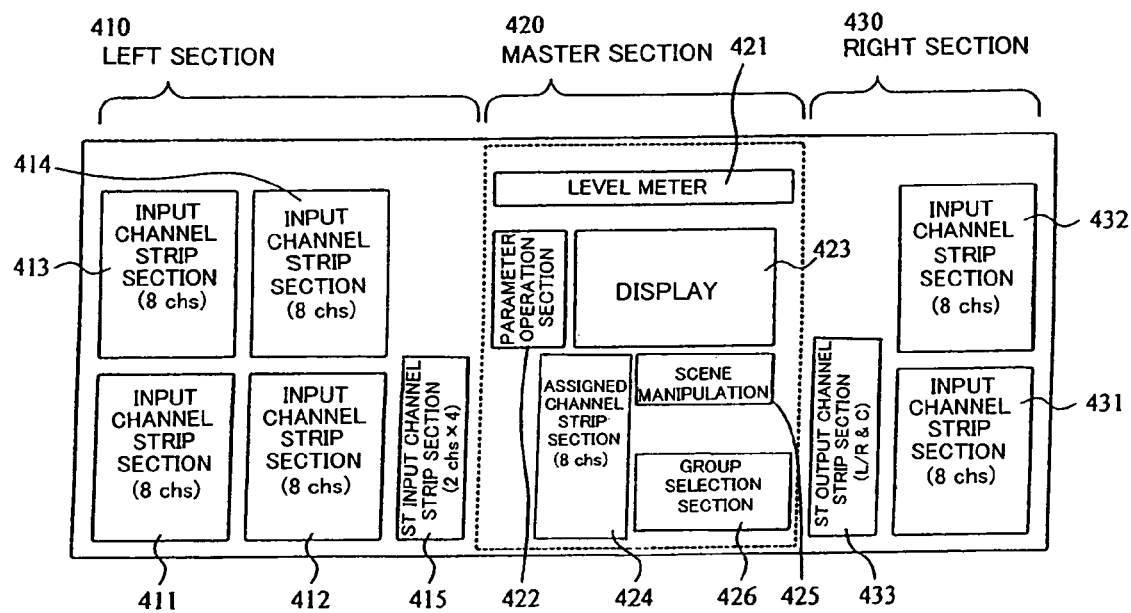
FIG. 4 is a block diagram showing an example layout of operators on an operation panel of the mixer.

FIG. 4 shows an example layout of various operators on the operation panel in the embodiment of the mixer. As the human operator faces, there are provided a left section 410 on the left side of the operation panel, a master section 420 in the middle, and a right section 430 on the right side. The left section 410 includes input channel strip sections 411-414, and the right section 430 includes input channels strip sections 431 and 432. The input channel strip sections 411-414, 431 and 432 each include operators of eight of the input channels 204 shown in FIG. 2; namely, the strip sections 411-414, 431 and 432 include 1st-8th input channels, 9th-16th input channels, 17th-24th input channels, 25th-32nd input channels, 33rd-40th input channels and 41st-48th input channels, respectively. ST input channel strip section 415 includes operators corresponding to the stereo input channel 205 of FIG. 2, and a ST output channel strip section 433 of the right section 430 includes operators corresponding to the stereo output channel 209 of FIG. 2. The master section 420 includes a level meter 421, a parameter operation section 422, a display 423, an assigned channel strip section 424, a scene manipulation section 425 and a group (G) selection operation section 426.

Figure 5A:
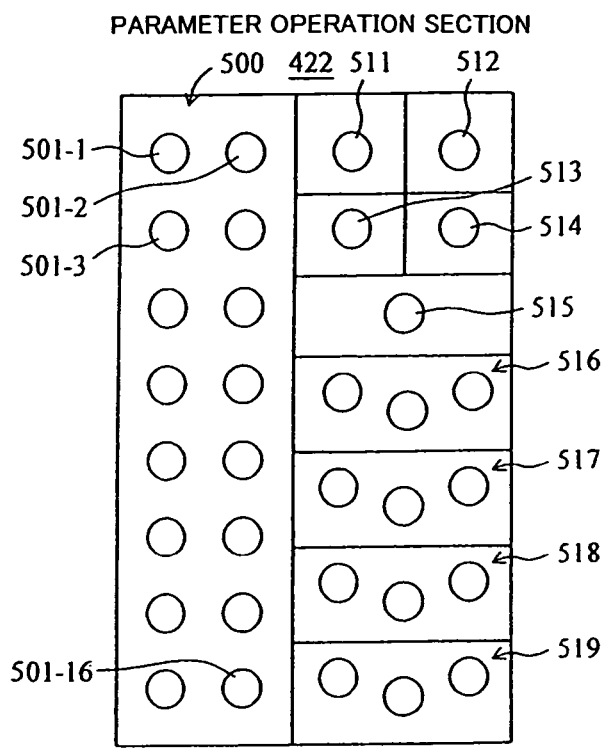
FIGS. 5A-5C are diagrams showing detailed constructions of a parameter operation section etc.

FIG. 5A shows a detailed construction of the parameter operation section 422 of the master section 420 of FIG. 4. The parameter operation section 422 includes a plurality of operators for controlling, in a parallel fashion, a plurality of parameters of a particular channel selected by the user from among the input channels 204, stereo input channels 205, stereo output channels 209, MIX output channels 210 and matrix output channels 212. Here, information pertaining to the currently-selected channel is constantly displayed in a selected channel display area (640 in FIGS. 6 and 7) of a screen displayed on the display device 423. Reference numeral 500 indicates a rotary encoder area, in which are provided 16 rotary encoders 501-1-501-16. Reference numerals 511-515 indicate the rotary encoders for setting various parameters of a designated channel. Three rotary encoders provided in each of areas 516-519 are for equalizer adjustment in a designated channel, Each of these rotary encoders has a function of generating a push operation event when it is depressed.

Figure 5B:
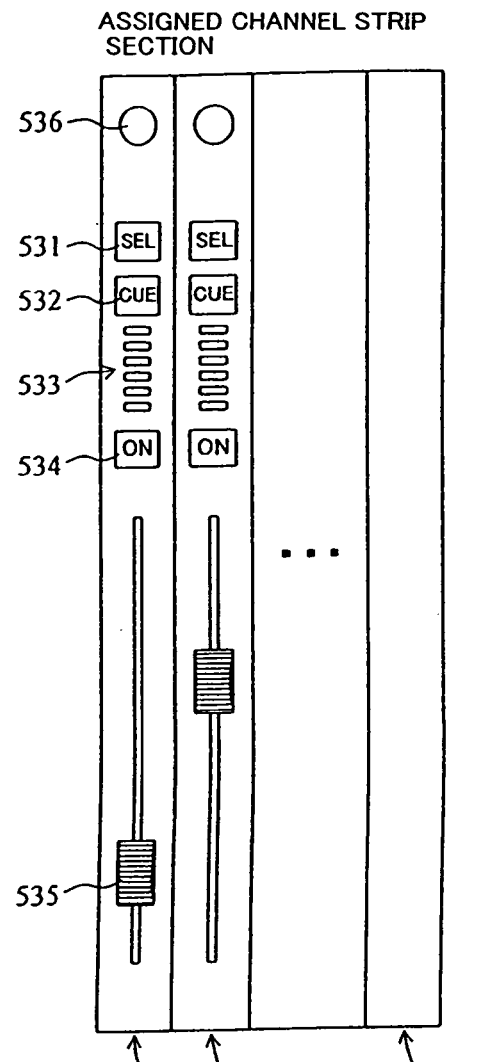

FIG. 5B shows a detailed construction of the assigned channel strip section 424 of FIG. 4. The assigned channel strip section 424 includes eight channel strips 530-1-530-8.

Let it be assumed here that a relationship of "m>k" is established if the total number of channels to be assigned is m (e.g., 48) and the number of channels in the assigned channel strip section 424 is k (e.g., 8). Each of the channel strips (e.g., 530-1) includes a SEL switch 531, CUE switch 532, LEDs 533 functioning as a level meter, ON switch 534, and electric fader 535. Each of the switches 531, 532 and 534 includes an LED that is illuminated when the switch is turned on but deilluminated when the switch is turned off. The SEL switch 531 is operable to select the channel assigned to the channel strip in question and select a mode in which detailed parameter setting for the channel is performed on a selected channel screen to be later described in relation to FIG. 7. The CUE switch 532 is a switch for turning on/off the signal output from the channel in question to the CUE bus 208 explained above in relation to FIG. 2. The LEDs 533 together constitute a meter for displaying, in real time, a level value of the signal input to the channel in question. The ON switch 534 is provided for switching between ON and OFF states of the signal of the channel, and it corresponds to the ON switch 306 of FIG. 3. The electric fader 535 is an operator for setting a signal level of the channel, and it corresponds to the fader 307 of FIG. 3 in a normal mode; in a send mode, the electric fader 535 functions as a send level (i.e., signal delivery level) controlling fader in the adjustment section 308 of FIG. 3. In response to an instruction from the CPU 101, the knob of the electric fader 535 can be set to a predetermined position. Reference numeral 536 indicates a rotary encoder (or rotary operator) provided in only the assigned channel strip section 424. The rotary encoder 536 of each of the channel strips 530-1-530-8 has a function for changing a value of a parameter corresponding to a currently-selected display element on the strip screen displayed on the display device 423 or a value of a predetermined parameter on a later-described parameter window. Further, these rotary encoders 536 each have a function for generating a push operation event when depressed. The other channel strip sections 411-415 and 431-433 are constructed similarly to the assigned channel strip section 424, except that these channel strip sections 411-415 and 431-433 have no rotary encoder 536.

Figure 5C:
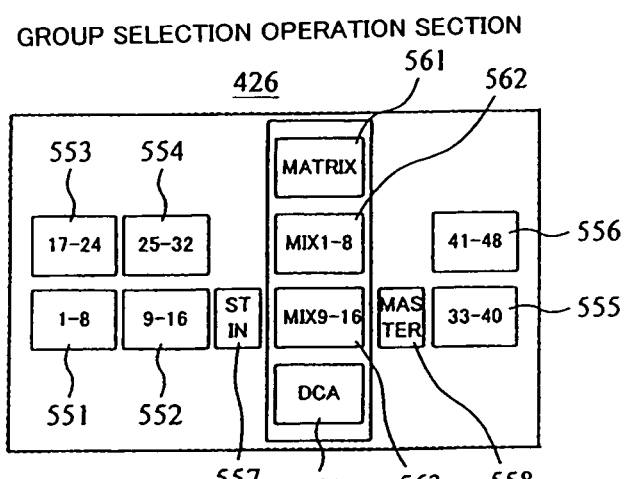

FIG. 5C shows a detailed construction of the group ("G") selection operation section 426 of FIG. 4. Six selection switches 551-556 in FIG. 5C correspond to the input channel strip sections 411-414, 431 and 432 of FIG. 4, and these switches 551-556 are operable to allocate (or call out) the input channel strip sections 411-414, 431 and 432 to the assigned channel strip section 424. If, for example, the selection switch 551 is turned on, the input channel strip section 411 is allocated to (i.e., called out to) the assigned channel strip section 424, so that the eight assigned channel strips 530-1-530-8 of FIG. 5B function as input channel strips for the 1st-8th input channels. In this way, each of the input channel strip sections 411-416 can be allocated to the assigned channel strip section 424 of the master section 420 provided in the middle of the mixer operation panel in response to turning-on of a predetermined one of the selection switches 551-556; for example, turning-on the selection switch 552 can cause the 9th-16th input channels to be assigned to the assigned channel strip section 424, turning-on the selection switch 553 can cause the 17th-24th input channels to be assigned to the assigned channel strip section 424, and so on. Similarly, the ST input channel strip section 415 of FIG. 4 is allocated to the assigned channel strip section 424 in response to turning-on of a STIN switch 557 of the group selection operation section 426, and the ST output channel strip section 433 of FIG. 4 is allocated to the assigned channel strip section 424 in response to turning-on of a master switch 558. The ST input channel strip section 415 includes four channel strips and the ST output channel strip section 433 includes two channel strips, so that, when the ST input channel strip section 415 or ST output channel strip section 433 is assigned to the assigned channel strip section 424, only the left four or two channel strips of the channel strip section 424 are enabled or made valid. Reference numerals 561-564 indicate assignment switches for performing operation or manipulation of internal channels not present on the operation panel. More specifically, 561 indicates a selection switch for instructing that the assigned channel strip section 424 be used as an operator for manipulating each of the eight MIX output channels 210 of FIG. 2. 562 indicates a selection switch for instructing that the assigned channel strip section 424 be used as an operator for manipulating the 1st-8th channels of the MIX output channels 210 of FIG. 2, and 563 indicates a selection switch for instructing that the assigned channel strip section 424 be used as an operator for manipulating the 9th-16th channels of the MIX output channels 210. Further, 564 indicates a selection switch for instructing that the assigned channel strip section 424 be used as an operator for manipulating individual channels when a not-shown DCA function is used.

One of the selection switches 551-558 and 561-564 of the group selection operation section 426 is turned on at a time, and the selection switches 551-558 and 561-564 each include an LED that is illuminated in response to turning-on of the selection switch to thereby indicate which of the selection switches is currently selected. Once one of the selection switches 551-558 and 561-564 has been newly turned on from the OFF state, the newly-turned-on selection switch is illuminated while the selection switch having so far been illuminated is deilluminated. A set of the channels that can be allocated or called out to the assigned channel strip section 424 through operation of any one of the selection switches 551-558 and 561-564 will hereinafter be referred to as "group".

Figure 6:
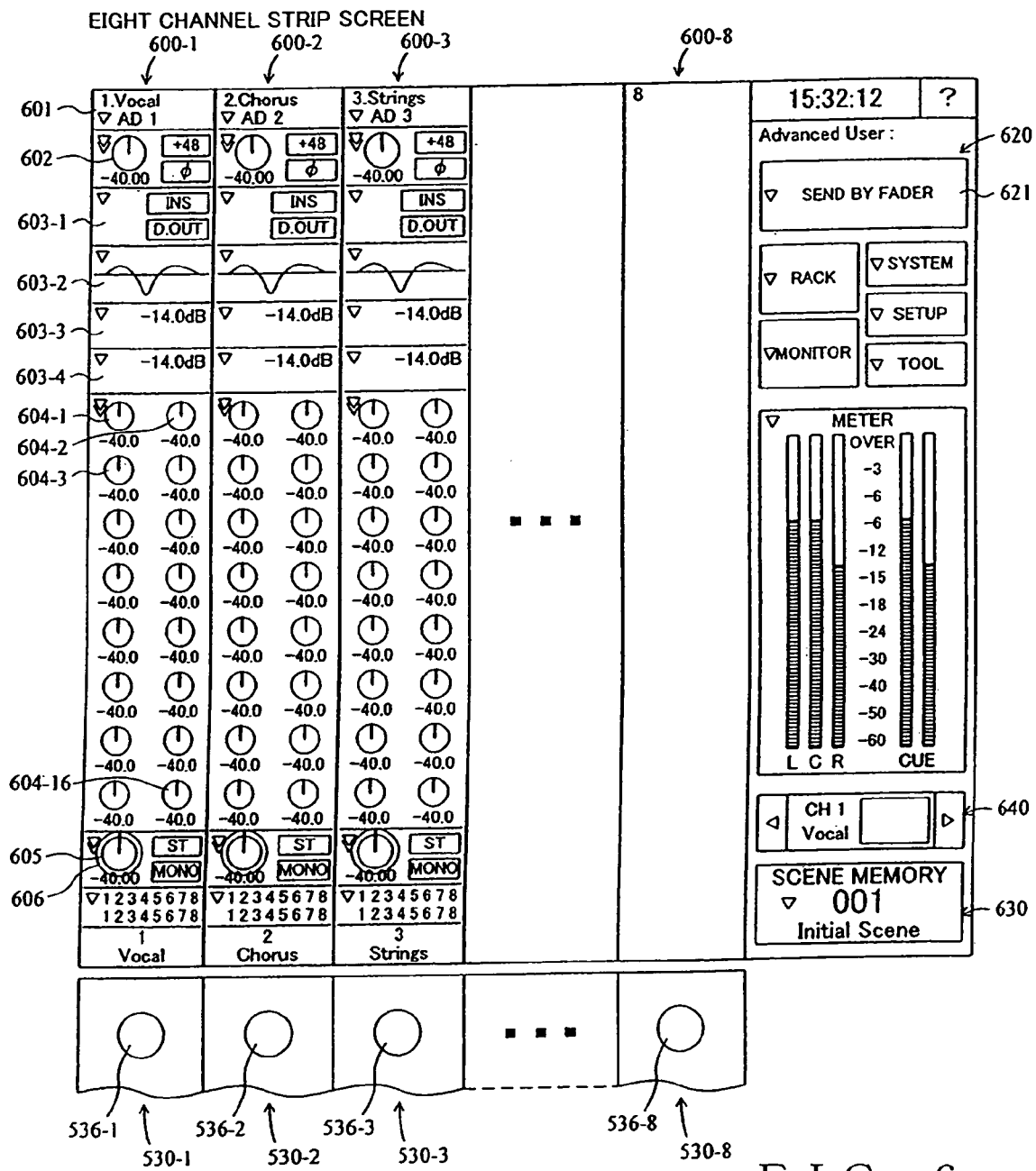
FIG. 6 is a diagram showing an example of an eight channel strip screen.

FIG. 6 is an example of an eight channel strip screen displayed on the display device 423 of FIG. 4. The eight channel strip screen is a screen for displaying settings of the individual (i.e., eight) channels of the group selected through operation of any one of the selection switches 551-558 and 561-564. Namely, once any one of the selection switches 551-558 and 561-564 is turned on, the eight channel strip screen corresponding to the turned-on channel is displayed on the display device 423. FIG. 6 shows an example of the eight channel strip screen displayed on the display device 423 when the input channel strip section 411 has been allocated to the assigned channel strip section 424 in response to tuning-on of the selection switch 551. Reference numerals 600-1-600-8 indicate areas for displaying parameter settings of the individual channels (in this case, 1st-8th input channels) of the selected group. These display areas 600-1-600-8 are displayed in such a manner that they are vertically opposed to corresponding ones of the channel strips 530-1-530-8 of the assigned channel strip section 424 provided in a lower portion of the display device 423.

For each of the display areas which corresponds to one channel, e.g. display areas 600-1, 601 indicates a partial display area for the channel number of the channel in question, name assigned to the channel and input route that inputs a signal to the channel, 602 indicates a partial display area for a knob and its value indicative of a setting of an analog gain of a head amplifier (provided within the A input section of FIG. 2) connected to the input channel via the input patch section, and 603-1-603-4 indicate partial display areas for settings of various signal processing in the input channel. The knob 602 is a visual indication simulative of a knob of a rotary encoder, which is displayed as rotated by an amount corresponding to a level setting thereof. The "settings of various signal processing" in the areas 603-1-603-4 indicate parameter settings of the HPF 302, PEQ 303 and first and second dynamics sections 304 and 305, respectively, of the channel which have been described above in relation to FIG. 3. The ATT 301 of FIG. 3 is not displayed on the screen of FIG. 6, because it is evaluated as a parameter that is not important enough to be displayed on the strip screen of FIG. 6. However, setting of the ATT 301 can be performed on a later-described parameter window. Rectangular blocks labeled "INS" and "D.OUT" located in a right-side portion of the area 603-1 indicate an INS button and D.OUT button, respectively. These buttons can each be turned on/off by being touched with a finger or the like. The INS button is a button for setting validity/invalidity of insertion, into the input channel, of an inner effecter not shown in FIG. 2. The D.OUT button is a button for setting validity/invalidity of direct signal output from the input channel in question to the output patch section 213 of FIG. 2.

604-1-604-16 represent knobs indicating send level settings of signals to be output from the channel to the 16 MIX buses (206 of FIG. 2); the knob 604-n corresponds to the nth MIX bus MIXn. 605 represents a knob indicating left/right localization (panning) settings when signals are to be output from in stereo from the input channel to the stereo buses (207 in FIG. 2). Signal processing related to the send level and panning is carried out in the panning/mixing level adjustment section 308 of FIG. 3. Rectangular blocks labeled "ST" and "MONO" indicate ST and MONO buttons. By touching and turning on/off these buttons, it is possible to turn on/off signals to be output from the input channel to the L and R buses of the stereo buses 207 (i.e., turning on/off by the ST button) and turn on/off a signal to be output from the input channel to the C bus (i.e., turning on/off by the MONO button).

For convenience of explanation, let it be assumed here that the same reference numerals as attached to the display elements of the display area 600-1 are attached to the display area 600-2-600-8. Thus, the knob 604-1 in the display area 600-2, for example, corresponds to the knob 604-1 in the display area 600-1. The same explanation applies to the channel strips described above in relation to FIG. 5.

Any one of the knobs 602, 604-1-604-16 and 605 can be set to a selected state by being touched by the human operator. Cursor 606 is set to the knob currently in the selected state. The cursor 606 has a ring shape overlapping the display of the knob. When the knob of any one of the channels in the display areas 600-1-600-8 is touched, the knobs at the corresponding positions in the display areas 600-1-600-8 of the individual channels are simultaneously selected in parallel (operation when the knob already in the selected state is touched again will be later described). Namely, if, for example, the knob 604-3 in the display area 600-2 is touched, all of the eight knobs 604-3 at the corresponding positions in the display areas 600-1-600-8 are set to the selected state. The eight cursors displayed in parallel here will hereinafter be referred to as "eight-channel ring". Parameter values corresponding to the knobs set having been set to the selected state in a parallel fashion can be changed independently of one another by means of the rotary encoders 536-1-536-8 of the assigned channel strips 530-1-530-8. While a plurality of parameters of a selected channel can be manipulated in parallel via the above-described parameter operation section 422, a given parameter for eight channels, selected by touching operation of the human operator (e.g., send level to any one of the MIX buses 206) and allocated to the assigned channel strips 530-1-530-8, can be manipulated in parallel, among the eight channels, via the rotary encoders 536. Thus, for the send level, for example, balance adjustment processing can be carried out easily from two viewpoints of the channel and parameter, such as parallel manipulation of the send levels from the selected input channel to a plurality of the MIX buses and parallel manipulation of the send level from the eight input channels to a single selected MIX bus.

Once any one of the buttons is touched while any one of the knobs in the display areas 600-1-600-8 is in the selected state, the function corresponding to the button operation is carried out (let it be assumed that the operated knob still remains in the selected state). In response to the touching of the knob, the eight knobs at the corresponding positions are set to the selected state; at the same time, the channel currently assigned to the assigned channel strip which the touched knob belongs to may be selected as a channel to be controlled by the parameter operation section 422. Further, a function for selecting the to-be-controlled channel in interlocked relation to the touching operation may be validated/invalidated in accordance with selection of the user.

Reference numeral 620 indicates a partial display area for displaying buttons to be used in performing various setting for the mixer, meters indicative of levels of output levels of the L/R and C signals, etc. 621 represents a button operable to change an operation mode of the electric fader 105 (e.g., 535 in FIG. 5). When the button 621 is OFF, the operation mode is a "normal mode", in which the electric faders of the individual channel strips function, as faders for controlling levels of signals of the corresponding channels, to control levels (gains) of signals in the position of the fader 307 in FIG. 3. When the button 621 is ON, the operation mode is a "send mode", in which the electric faders of the individual channel strips function, as faders for controlling send levels from the corresponding channel, to control send levels (gains) of signals in the adjustment section 308 in FIG. 3. In the "send mode", buttons for selecting one (or one pair) of the 16 MIX buses and stereo buses are displayed in the meter display region of the display area 620. Bus to be subjected to send level control by the electric faders can be selected by operation of any of the displayed buttons. 630 represents a partial display area indicative of a currently-called scene. Using operators of the scene manipulation section 425 (FIG. 4) located below the indication 630, the scene number can be increased or decreased, and a desired scene can be recalled or stored. 640 represents a partial display area indicative of the currently-selected channel; here, an input channel "CH1" assigned a name "Vocal" is currently selected. Selection of the channel can be made either by operation of the SEL switch of the channel strip or by operation of any one of buttons provided at left and right ends of the area 640.

Whereas the display screen of FIG. 6 has been described in relation to the eight channel strip screen for the 1st-8th input channels displayed in response to turning-on of the selection switch 551, other eight channel strip screens to be displayed in response to turning-on of the selection switches 552-558 and 561-564 are constructed in generally the same manner as explained above. However, when the selection switch 557 has been turned on, displays for four channels from the left (600-1-600-4) are made, but, when the selection switch 558 has been turned on, displays for two channels from the left (600-1 and 600-2) are made. Further, output channels are displayed in response to turning-on of the selection switches 558 and 561-564, but contents of processing in these output channels are slightly different from the contents of the processing explained above in relation to FIG. 3, so that displays, for one channel, in the display areas 601-606 etc. of the strip screen differ from those of FIG. 6. For example, the partial display area 602 corresponding to the head amplifier is not provided for the output channels, because sources of signals input to these channels are buses, and besides, the INS button in the display area 603-1, knob, ST button and MONO button in the display area 605, etc. are not provided. Further, the eight send-level controlling knobs 604-1-604-8 corresponding to the eight matrix buses 211, which are output destinations of signals, are displayed only for the stereo output channels and MIX output channels.

Figure 7:
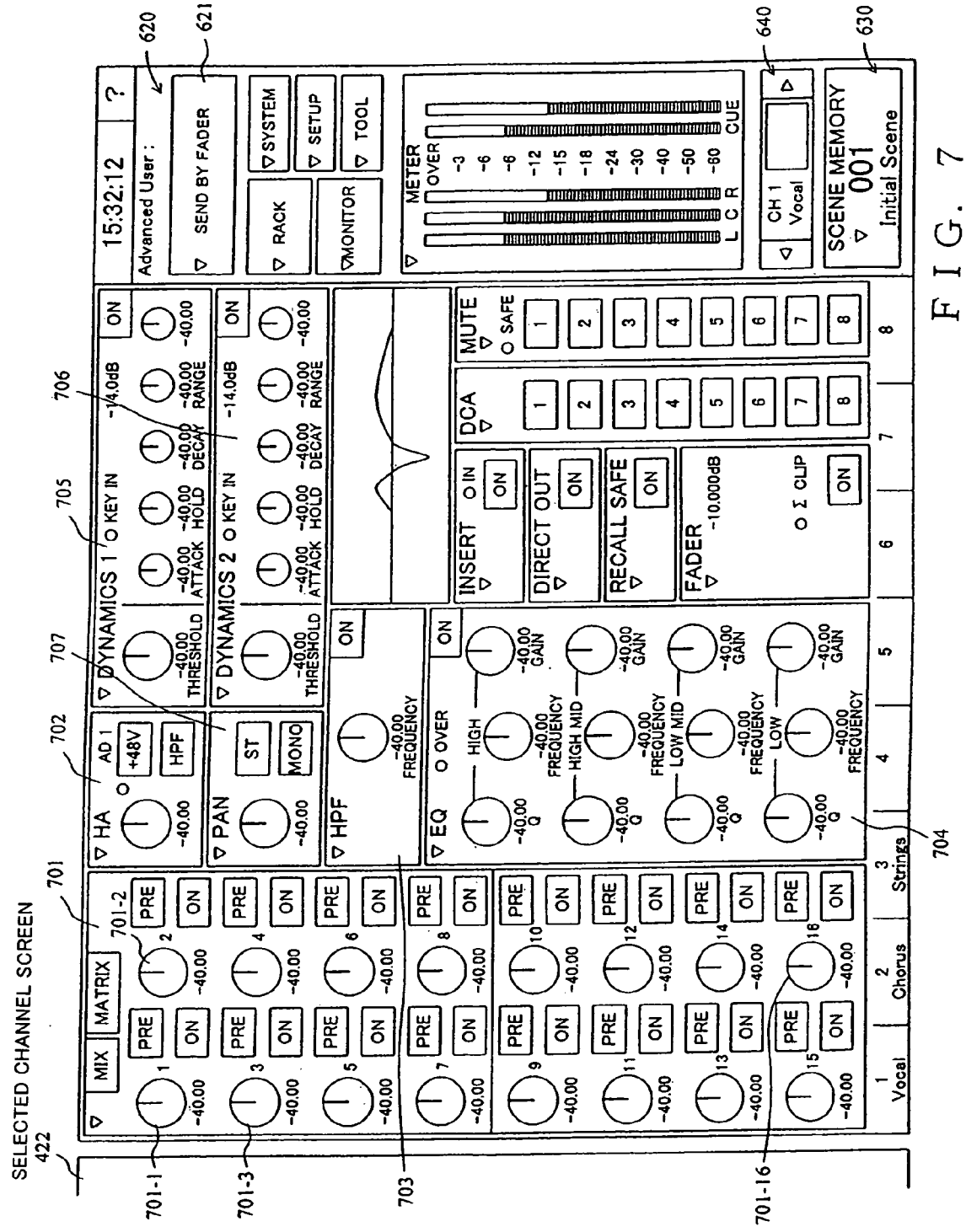
FIG. 7 is a diagram showing an example of a selected channel screen.

FIG. 7 shows an example of the selected channel screen displayed on the display device 423 of FIG. 4. Upon turning-on of the SEL switch of any one of the input channel strip sections 411-416, stereo input channel strip section 41, stereo output channel strip section 418 and assigned channel strip section 424 (e.g., SEL switch 531 in FIG. 5), the channel corresponding to the turned-on SEL switch of the channel strip is selected as a channel to be subjected to the parameter operation by the parameter operation section 422, at which time this selected channel screen is displayed as a screen indicating detailed parameter settings of the selected channel. FIG. 7 shows by way of example the selected channel screen for the 1st channel of the input channels. Whereas the selected channel screen has been explained above as activated in response to operation of any one of the SEL switches, let it be assumed here that there is another option to allow the user to set validity/invalidity of the function of activating such a SEL switch (selection of a channel to be the parameter operation is made in any case).

Reference numeral 701 represents a partial display area for 16 knobs 701-1-701-16 indicative of send levels from the selected input channel to the 16 MIX buses 206. PRE button and ON button are provided to the right of each of the knobs 701-1-701-16. 702 represents a partial display area for a knob indicative of a gain level of a head amplifier provided at a stage preceding the selected input channel. 703-706 represent partial display areas for indicating parameter settings of the HPF 302, PEQ 303 and first and second DYNAMICS sections 304 and 305 of the selected input channel explained above in relation to FIG. 3. In each of the partial display areas 703-706, a necessary number of knobs are displayed. 707 represents a partial display area for a knob indicative of panning settings of output signals from the selected input channel to stereo buses (207 in FIG. 2). In addition, one or more other partial display areas are displayed, as necessary, to indicate parameter settings for the selected input channel. Partial display areas 620, 621, 630 and 640 in a right-end region of the screen are similar to the partial display areas of the same reference numerals on the strip screen of FIG. 6.

Positions of the knobs displayed in the partial display areas 701-707 (in the partial display areas 705 and 706, only THRESHOLD adjusting knobs) correspond to the positions of the rotary encoders of the parameter operation section 422, located to the left of the display device 423, explained above in relation to FIG. 5A, and it is possible to change the parameter value of any one of the corresponding knobs by operating the corresponding rotary encoder of the parameter operation section 422. Such positional correspondence permits straightforward operation.

One or more other buttons are provided, as necessary, in each of the partial display areas of the selected channel screen. For example, rectangular blocks labeled "ST" and "MONO" indicate ST and MONO buttons. By touching the ST button, it is possible to turn on/off signals to be output from the selected input channel to the L and R buses of the stereo buses 207. By touching the MONO button, it is possible to turn on/off a signal to be output to the C bus.

Whereas the selected channel screen for the 1st input channel has been explained above in relation FIG. 7. the selected channel screen for each of the other channels is constructed in generally the same manner to the screen of FIG. 7; note however that displays in the partial display areas 701-707 etc. on the selected channel screens for the other channels may differ from those in FIG. 7 depending on the construction of the channel.

Here, a description is given about screen switching responsive to a push operation event of any one of the rotary encoders of the assigned channel strip section 424 and parameter operation section 422. Upon depression of any one of the rotary encoders, a switchover is made to the last-displayed selected channel screen (saved in memory) if the strip screen is currently displayed, or to the last-displayed group screen (saved in memory) if the selected channel screen is currently displayed. Thus, switching can be readily made between different screens by the human operator placing his or her hand on any one of the rotary encoders. Normally, the human operator performs operation on the group screen, but, when only a predetermined parameter of a given channel is to be confirmed or adjusted, for example, it is more convenient for the human operator to use the screen switching function responsive to a push operation event of any one of the rotary encoders. Note that the functions of the operators of the channel strip section 424 and parameter operation section 422 do not change even when switching has been made between the screens. Thus, even when the human operator pushes any one of the rotary encoders of the parameter operation section 422 to confirm, on the selected channel screen, a particular parameter that can be changed in value via the rotary encoder and then again pushes the one rotary encoder to switch over to the group screen, it is possible to finely adjust the value of the parameter corresponding to the one rotary encoder.

On either the strip screen of FIG. 6 or the selected channel screen of FIG. 7, the human operator can touch any one of the buttons and knobs on the screen to turn on/off the button or select the knob. However, the parameter value indicated by each of the knobs can not be changed by touching operation on the screen and has to be changed using the corresponding rotary encoder provided on the operation panel. Thus, the parameter value indicated by each of the knobs can be reliably prevented from being changed by the human operator touching the screen by mistake. Value of the corresponding parameter stored in a current memory is changed in response to operation of any one of the operators on the strip screen, selected channel screen and various manipulation sections, as a result of which the changed parameter value is reflected in the ON/OFF state of each corresponding button and in the setting of each corresponding knob. The strip screen of FIG. 6 and the selected channel screen of FIG. 7 are screens forming the basis of various operation, and thus these screens will hereinafter be referred to as "base screens".

To facilitate recognition of the correspondency between the parameter operation section 422 and the selected channel screen and between the assigned channel strip section 424 and the group screen, it is preferable that the backgrounds of the parameter operation section 422 and selected channel screen be displayed in first similar colors and the backgrounds of the assigned channel strip section 424 and group screen be displayed in second similar colors that are different from the first similar colors. With such background colors, the human operator can identify at a first glance whether the currently-displayed screen is the group screen or the selected channel screen, and can also readily identify which of the parameter operation section 422 and assigned channel strip section 424 is to be currently manipulated. Correspondency between the rotary encoders and the knob indications (i.e., knob images) on the screens may be indicated by colors of the knobs of the rotary encoders.

Now, a description will be given about single downward-pointing triangular marks and dual downward-pointing triangular marks displayed in various partial display areas on the strip screen of FIG. 6. These single downward-pointing triangular marks and dual downward-pointing triangular marks indicate that the partial display areas with the marks provided thereon (except for partial display areas indicated expressly as buttons) are each an area for functioning as a button for selecting the parameter indicated in the partial display area. More specifically, the partial display areas with the single downward-pointing triangular marks each indicate that the corresponding parameter is a "first-type parameter", while the partial display areas with the dual downward-pointing triangular marks each indicate that the corresponding parameter is a "second-type parameter". Once any one of the first-type parameters is selected (namely, a region, other than the button, within the partial display area (with the single downward-pointing triangular mark) indicative of the first-type parameter is touched), the eight-channel parameter window for performing detailed setting of the first-type parameter (hereinafter referred to as "eight-channel window") is displayed. Once any one of the second-type parameters currently not in the selected state is selected (namely, a region, other than the button, within the partial display area (with the double downward-pointing triangular mark) indicative of the second-type parameter is touched), the selected second-type parameter is set in the selected state. Once the second-type parameter set in the selected state is selected again, the eight-channel window for performing detailed setting of the second-type parameter is displayed. For example, the display areas where the knobs 604-1-604-16 of FIG. 6 are displayed are areas with the double downward-pointing triangular marks, and thus, the parameters of the individual knobs displayed in these display areas (i.e., send levels to the individual MIX buses) are the second-type parameters. Therefore, once any one of the knobs currently not in the selected state is touched (note that, if a background region near the knob is touched, it is considered that the knob closest to the touched region has been touched), the eight-channel ring moves to set the eight knobs corresponding to the touched position to the selected state. If the knob currently in the selected state is again touched, the eight-channel window is displayed. Note that each of the first-type parameters indicated by the single downward-pointing triangular marks is assumed to be of a relatively low frequency of use while each of the second-type parameters indicated by the second downward-pointing triangular marks is assumed to be of a relatively high frequency of use. Setting change of the first-type parameter has to be made on the parameter window and tends to involve cumbersome operation; however, such cumbersome setting change operation of the first-type parameter will not present a substantial problem because of its relatively low frequency of use. Each of the second-type parameters, on the other hand, can be changed in its setting on the base screen without the parameter window being opened.

Figure 8:
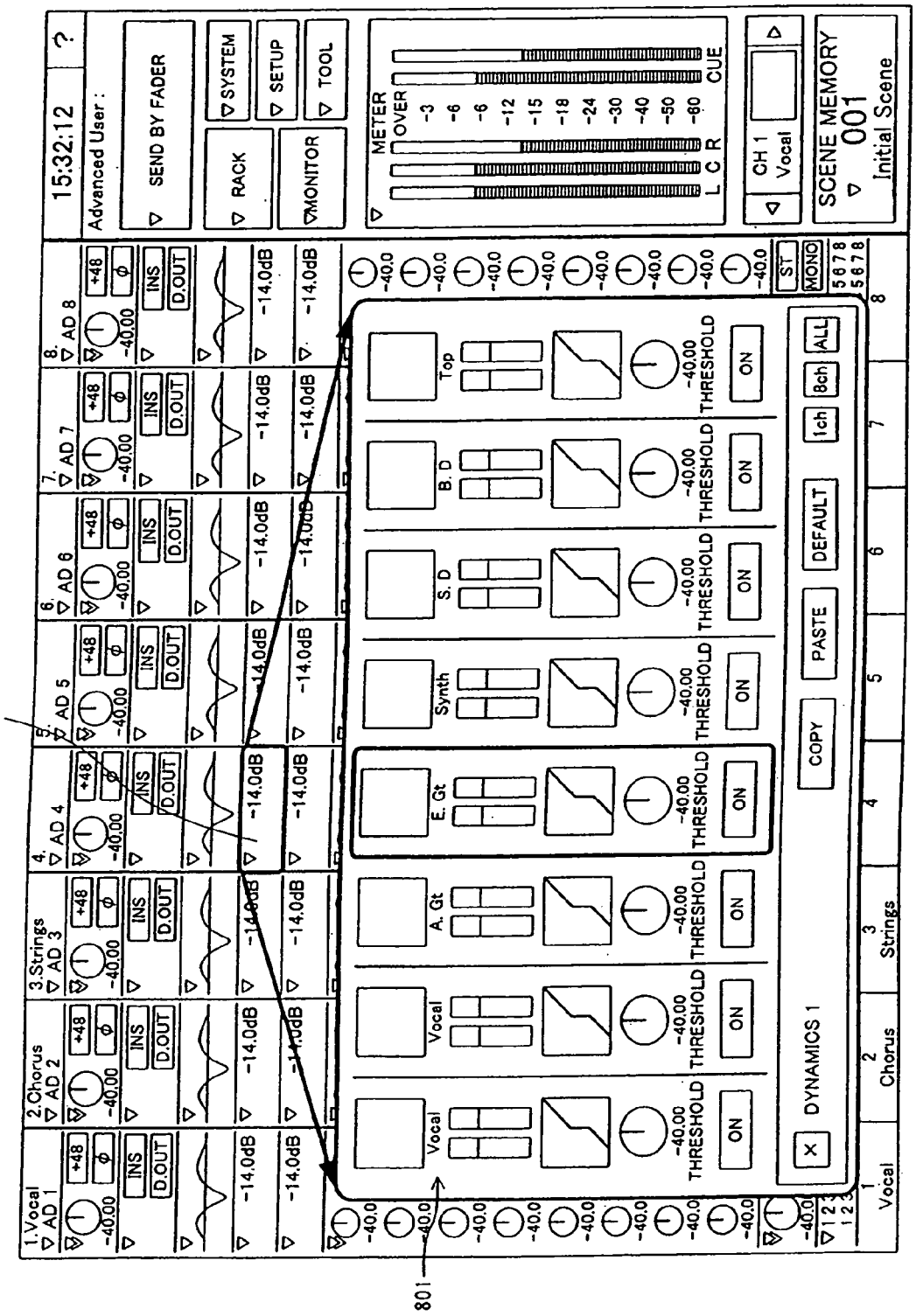
FIG. 8 is a diagram showing an example of an eight-channel window.
Figure 10A:
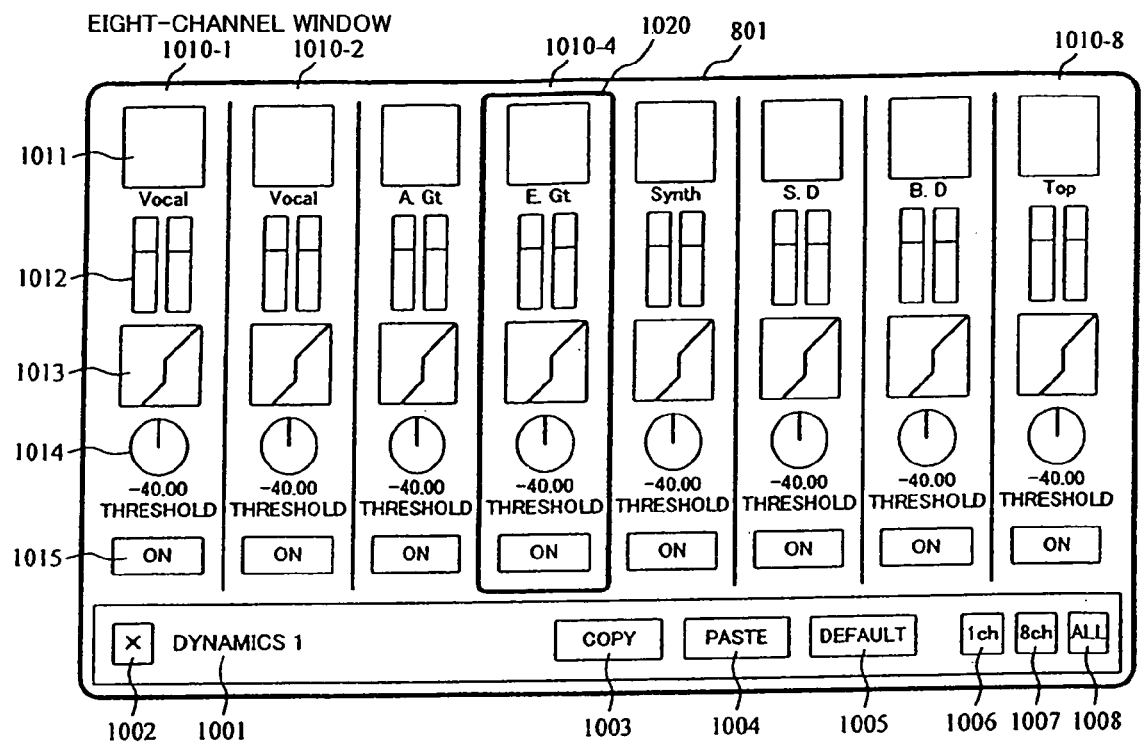
FIGS. 10A and 10B are diagrams showing examples of eight-channel windows.
Figure 10B:
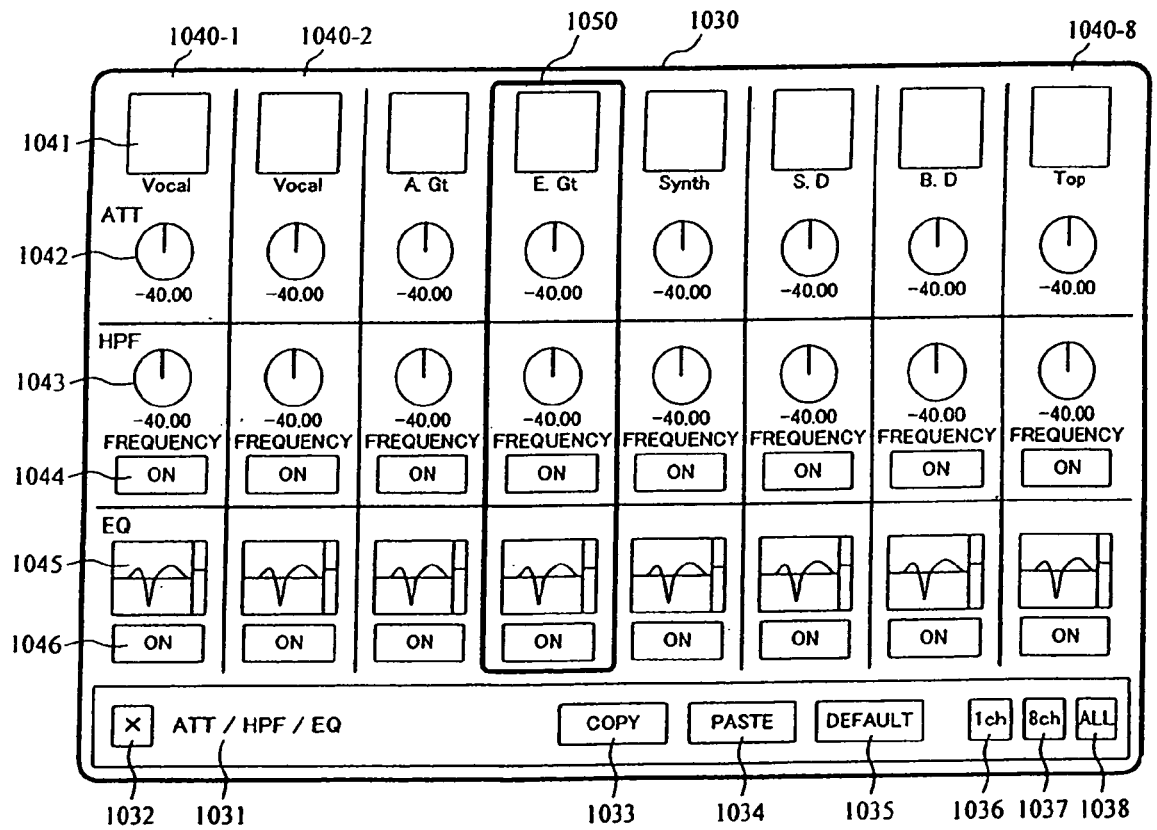
Figure 11:
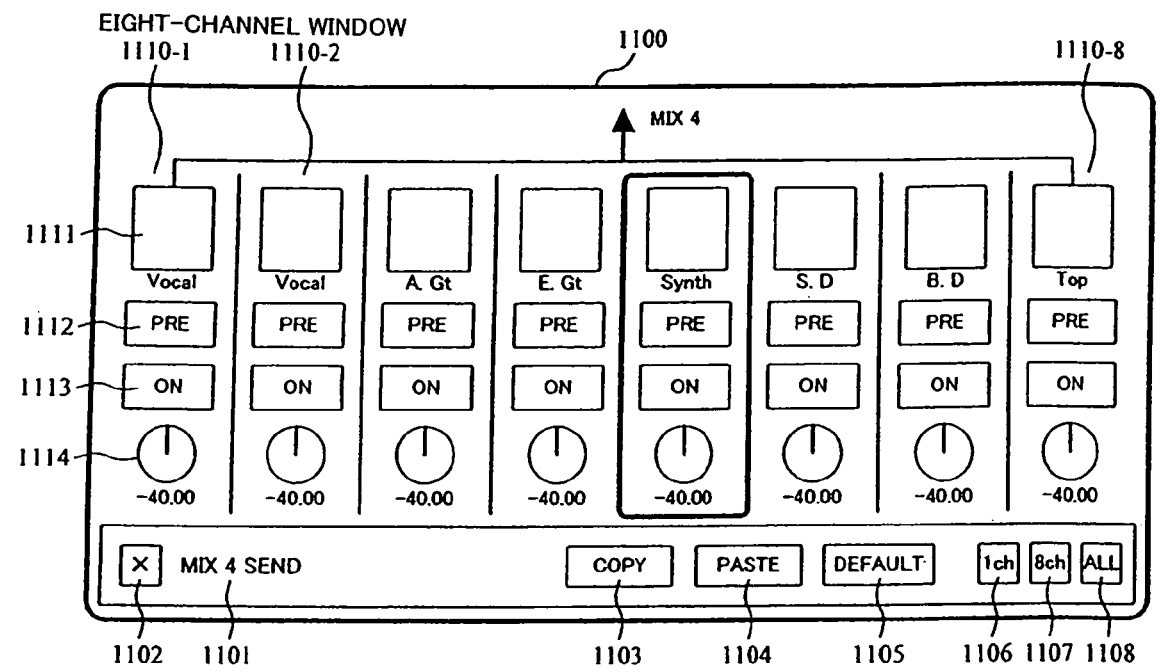
FIG. 11 is a diagram showing another example of the eight-channel window.

FIG. 8 shows an example of the eight-channel window 801 displayed in response to selection of the first DYNAMICS (first-type parameter) 603-3 (802 in FIG. 8) in the fourth-row display area 600-4 on the eight channel strip screen of FIG. 6. A plurality of types of such eight-channel windows are usable in the embodiment. The type of the eight-channel window to be displayed is determined depending on the first-type or second-type parameter selected. FIG. 10A shows the eight-channel window of the first dynamics ("DYNAMICS1"), and FIG. 10B shows the eight-channel window displayed in response to touching of the partial display area 603-1 or 603-2 of any one of the channels on the eight channel strip screen of FIG. 6. FIG. 11 shows the eight-channel window in response to selection of any one of the knobs 604-1-604-16 indicative of send levels from the individual channels to the individual MIX buses.

Figure 9A:
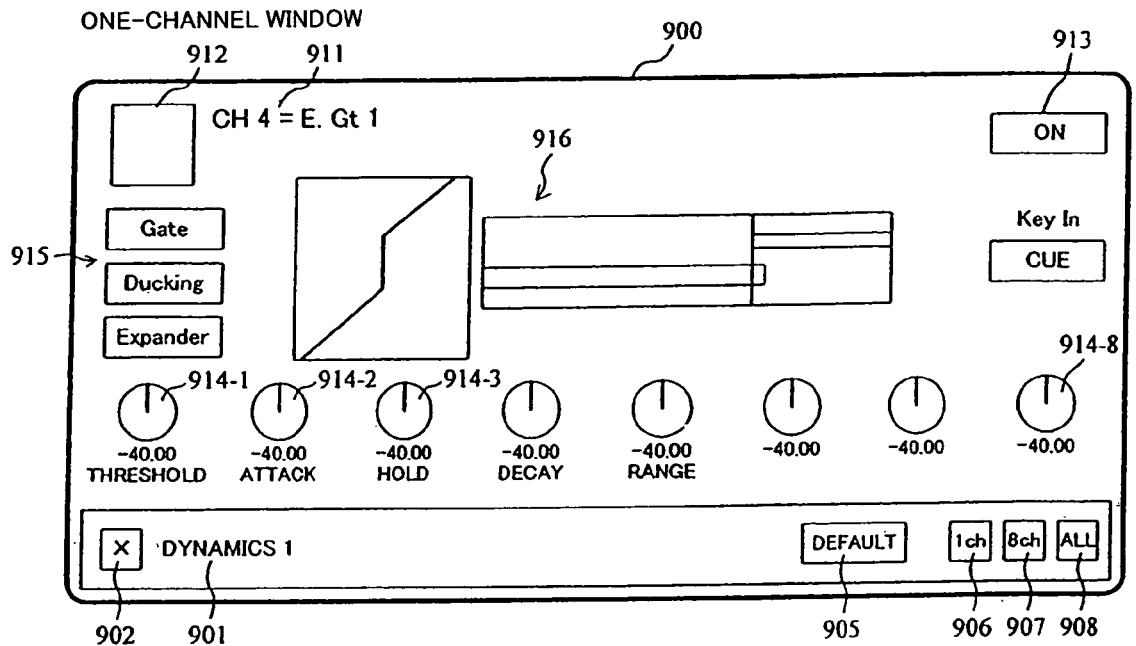
FIGS. 9A and 9B are diagrams showing examples of one-channel windows.
Figure 9B:
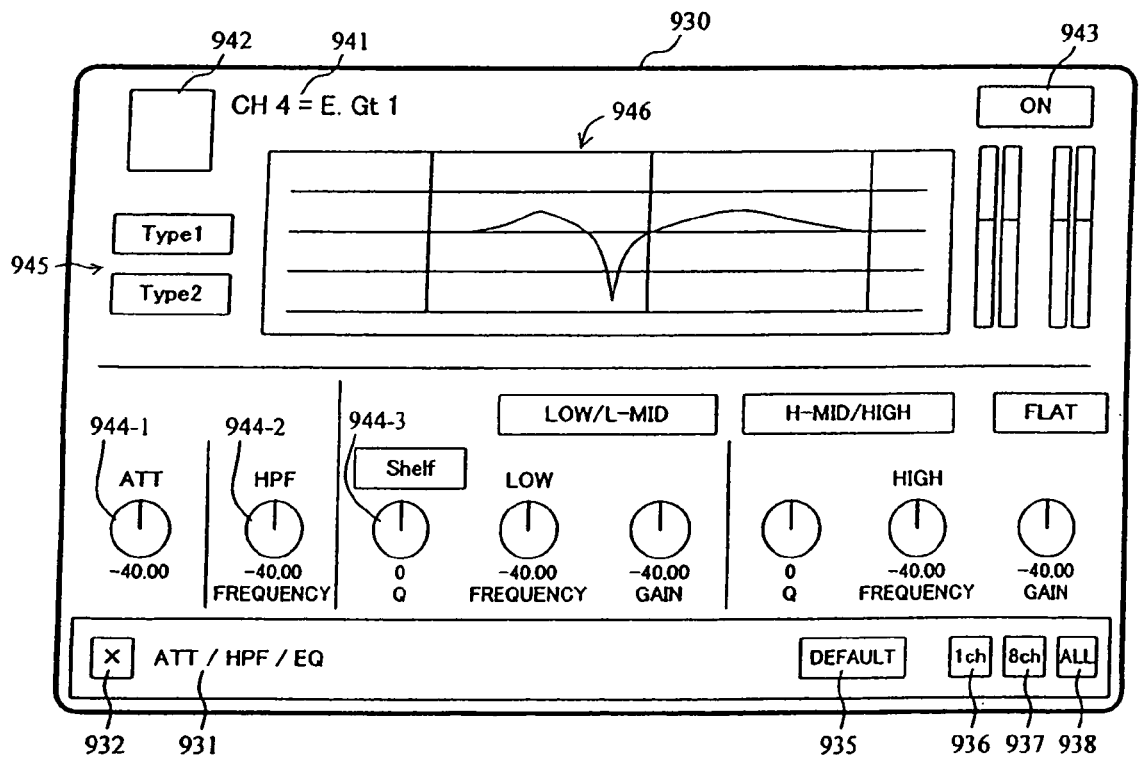

Downward-pointing triangular marks indicated in individual partial display areas on the selected channel screen of FIG. 7 are similar to the downward-pointing triangular marks indicated on the eight channel strip screen of FIG. 6. However, while the parameter window displayed from the eight channel strip screen of FIG. 6 is the eight-channel window, the parameter window displayed from the selected channel screen is a one-channel window (i.e., one-channel parameter window). The one-channel window is a window for performing more detailed setting of the parameter for the selected channel, and any one of a plurality of types of such one-channel windows is used depending on the selected parameter. For example, FIG. 9A shows the one-channel window displayed in response to touching of the partial display area 705 of DYNAMICS1 of FIG. 7. Because the partial display area 705 indicates a single downward-pointing triangular mark indicative of a first-type parameter, the one-channel window of FIG. 9A is displayed once any position within the partial display area 705 is touched. FIG. 9B shows the one-channel window displayed in response to touching of the partial display area 703 or 704 on the selected channel screen of FIG. 7. Let it be assumed that, once any one of the knobs 701-1-701-16, indicative of send levels to the individual MIX buses (or to the MATRIX buses), in the partial display area 701 of the selected channel screen of FIG. 7, the eight-channel window indicative of the send levels to the corresponding MIX bus (or to the corresponding MATRIX bus) (see FIG. 11) is displayed; the reason why the eight-channel window is displayed is that, for the send levels, there is no parameter important enough to create a one-channel window.

The following paragraphs describe details of various parameter windows, with reference to FIGS. 9-13.

FIG. 9A shows an example of the one-channel window 900 for the first dynamics (DYNAMICS1 of FIG. 3). Reference numeral 901 represents a headline indicating that the one-channel window is for performing detailed parameter setting related to DYNAMICS1, 902 a button for closing the window, 905 a default button, 906 a 1-ch button, 907 an 8-ch button, and 908 an ALL button. Further, 911 represents a partial display area for the channel number and name (e.g., desired channel number and name assigned by the user) that indicates which of the channels this one-channel window is for, and 902 represents an icon (not shown) selected simultaneously with the assignment, by the user, of the channel name. 913 represents a button for setting an ON/OFF state of DYNAMICS1 in the channel. When the button 913 is ON, DYNAMICS1 functions validly in the signal processing explained above in relation to FIG. 3, while, when the button 913 is OFF, DYNAMICS1 functions invalidly in the signal processing. 914-1-914-8, 915, 916 etc. represent buttons, knobs etc. for performing detailed parameter setting of DYNAMICS1. Particularly, the knobs 914-1-914-8 indicate parameters that can be manipulated via encoders 536-1-536-8 in the lower portion of the screen.

When only the base screen (FIG. 6 or 7) is being displayed with no parameter window displayed in an overlapping relation to the base screen, the encoders 536-1-536-8 are assigned to the operators for currently-selected setting parameters where the eight-channel ring has been set on the eight channel strip screen (FIG. 6). But, when any one of the parameter windows shown in FIGS. 9-13 is being displayed, the encoders 536-1-536-8 are set to function as operators for setting predetermined parameters in the parameter window. As the parameter window is closed, the encoders 536-1-536-8 are switched back to their original assignments.

Parameters of Dynamics 1 for the channel in question can be set to respective default values by the human operator touching and turning on the default button 905. The 1-ch button 906 is kept in a darkened or gray-out display state so that it can not be operated. Once the 8-ch button 907 is touched, a switchover is made to an eight-channel window related to DYNAMICS1 and including the channel in question (see FIG. 10A to be explained later). Once the ALL button 908 is touched, a switchover is made to an all-channel window related to DYNAMICS1 (see FIG. 12A to be explained later).

FIG. 9B shows an example of the one-channel window 930 related to ATT, HPF and EQ (i.e., ATT, HPF and EQ of FIG. 3). Elements 931-938 in a lower end portion of the screen correspond to the elements 901-908 of FIG. 9A and have similar functions to the elements 901-908. Upon touching of the 8-ch button 937, a switchover is made to a window of FIG. 10B, and, upon touching of the ALL button 938, a switchover is made to a window of FIG. 12B, Elements 941-943 in an upper end portion of the screen correspond to the elements 911-913 of FIG. 9A and have similar functions to the elements 911-913. 944-1-944-8, 945, 946 etc. represent buttons, knobs etc. for performing detailed parameter setting of ATT, HPF and EQ, and the knobs 944-1-944-8 indicate parameters that can be manipulated via the encoders 536-1-536-8 in the lower portion of the screen.

FIG. 10A shows an example of the eight-channel window 801 for DYNAMICS1, which includes a headline indication 1001, close button 1002, 1-ch button 1006, 8-ch button 1007 and ALL button 1008 similar to the elements of the corresponding names on the one-channel window for DYNAMICS1. Because this window 801 is an eight-channel window, the 8-ch button 1007 is kept in a darkened or gray-out display state so that it can not be operated. Once the 1-ch button 1006 is touched, a switchover is made to the window of FIG. 9A. Further, upon touching of the ALL button 1008, a switchover is made to the window of FIG. 12A.

Reference numerals 1010-1-1010-8 represent channel-specific display areas corresponding to the eight channels displayed on the original eight channel strip screen. Each one of the channel-specific display areas (for example, 1010-1) includes an indication 1011 of an icon and channel name of the channel, indications 1012 and 1013, e.g. each in the form of a graph, indicative of settings of parameters, a knob 1014 indicative of a representative parameter, and an ON/OFF button 1015. The "representative parameter" is a parameter representing functions of a plurality of parameters necessary to achieve one of the signal processing elements (functions) shown in FIG. 3. In the case of DYNAMINS1, for example, THRESHOLD is the representative parameter. On the eight-channel window, the representative parameters of the individual channels are displayed so that any one of the representative parameters can be manipulated via a corresponding one of the encoders 536-1-536-8. The ON/OFF button 1015 is a button for designating validity/invalidity of the function specified by the headline 1001 for the channel, which is similar to the button 913 of FIG. 9A.

Reference numeral 1020 represents a cursor, which can be set to a desired one of the channels by the human operator touching a corresponding one of the channel-specific display areas 1010-1-1010-8. Parameter of DYNAMICS1 of the channel where the cursor 1020 is currently set can be copied through operation of a COPY button 1003, and then the copied parameter of DYNAMICS1 can be pasted to another channel by the human operator setting the cursor 1020 to the other channel and then touching a PASTE button 1004. Further, the parameter of DYNAMICS1 of the channel where the cursor 1020 is currently set can be brought back to a default value through operation of a DEFAULT button 1005.

FIG. 10B shows an example of the eight-channel window for ATT/HPF/EQ. Elements 1031-1033 in a lower end portion of the eight-channel window correspond to the elements 1001-1008 of FIG. 10A and have similar functions to the elements 1001-1008. Upon touching of the 1-ch button 1037, a switchover is made to the window of FIG. 9B, and, upon touching of the ALL button 1038, a switchover is made to the window of FIG. 12B. Indications 1040-1-1040-8 and cursor 1050 corresponding to the eight channels displayed on the original eight channel strip screen are also similar to those shown in FIG. 10A. Of the channel-specific elements, 1041 represents an indication of an icon and channel name of the channel, and 1042-1046 represent buttons, knobs, etc. for performing detailed parameter setting of the ATT/HPF/EQ. Because this eight-channel window displays a set of a plurality of signal processing elements, the button 1044 for turning on/off the HPF and the button 1046 for turning on/off the EQ are provided independently of each other. For the ATT/HPF/EQ, the representative parameter is "EQ 1045".

Because both the knobs 1042 corresponding to ATT levels of the individual channels and the knobs 1043 corresponding to HPF frequencies are displayed on the window 1030, when the knob 1042 of any one of the channels has been selected, the same knobs 1042 of the individual channels are displayed with an enhanced brightness level (at which time the knobs 1043 are set in a gray-out display state), the ATT level can be manipulated via the encoders 536-1-536-8. When, on the other hand, the knob 1043 of any one of the channels has been selected, the same knobs 1043 of the individual channels are displayed with an enhanced brightness level (at which time the knobs 1042 are set in a gray-out display state), the HPF frequency can be manipulated via the encoders 536-1-536-8.

FIG. 11 shows an example of the eight-channel window for MIX4SEND (i.e., send level to the 4th MIX bus), which is opened when the knob 604-4 of any one of the channels currently in the selected state has been again touched. Elements 1101-1108 displayed in a lower end portion of the window correspond to the elements 1001-1008 of FIG. 10A and have similar functions to the elements 1001-1008. Upon touching of the ALL button 1108, a switchover is made to a window of FIG. 13. Because, for the send levels to the MIX buses, there is no parameter important enough to be displayed on a one-channel window, there is prepared no one-channel window corresponding to the eight-channel window of FIG. 11. Therefore, the 1-channel button 1106 as well as the 8-channel button 1107 is kept in a gray-out display state. Indications 1110-1-1110-8 corresponding to the eight channels and cursor displayed on the original eight channel strip screen are also similar to those shown in FIG. 10A. Elements 1111-1114 of the individual channels too are similar to the elements 1011-1015 of FIG. 10A. ON/OFF button 1113 is operable to switch between ON/OFF states of signal delivery (sending) from the channel in question to the 4th MIX bus. Send level indicated by the knob 1114 can be manipulated via the encoders 536-1-536-8. Here, the representative parameter is the send level indicated in a numerical value.

Figure 12A:
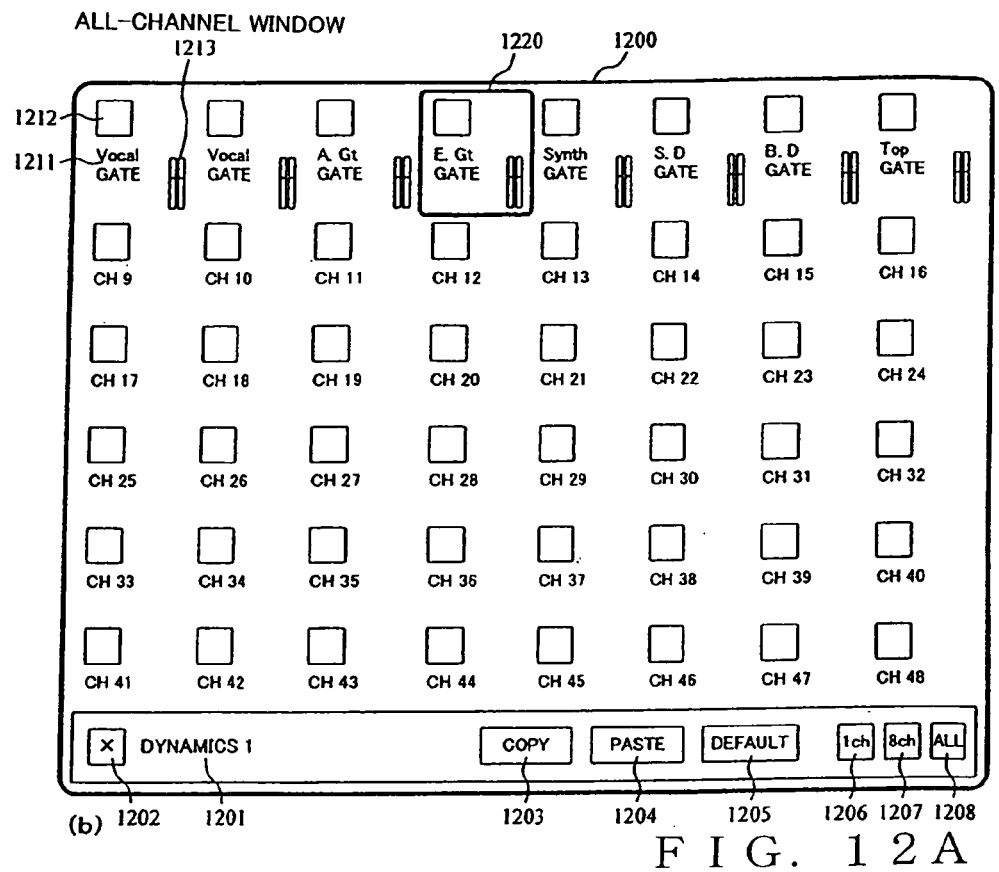
FIGS. 12A and 12B are diagrams showing examples of all-channel windows.
Figure 12B:
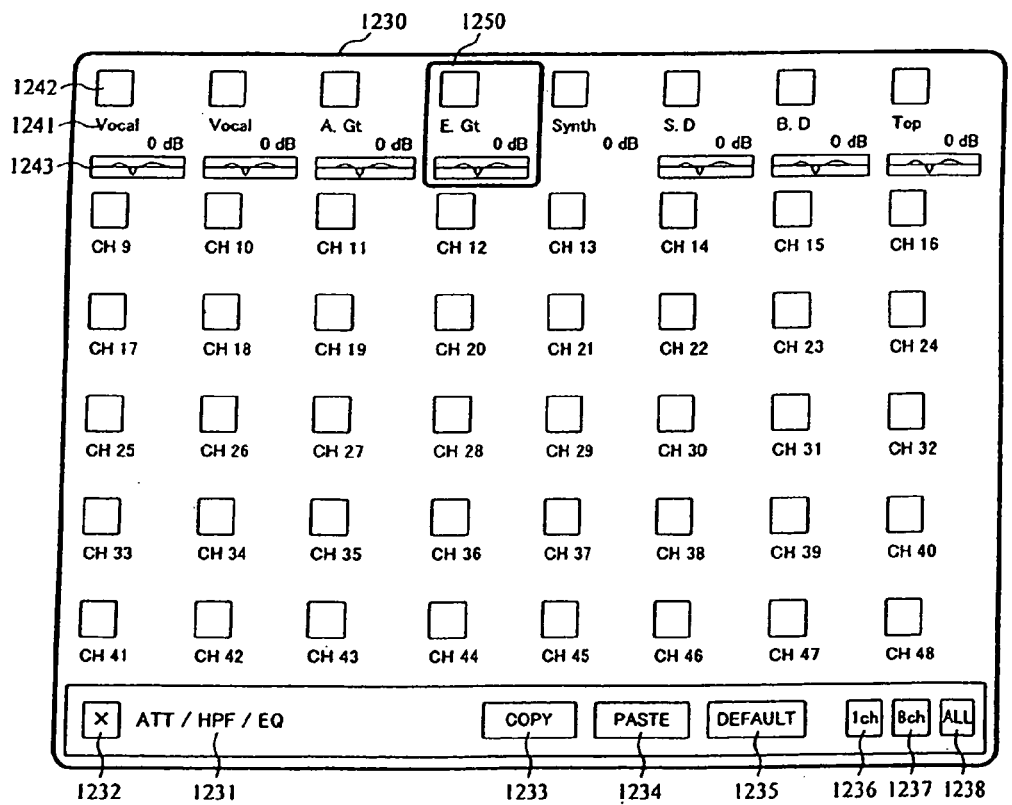
Figure 13:
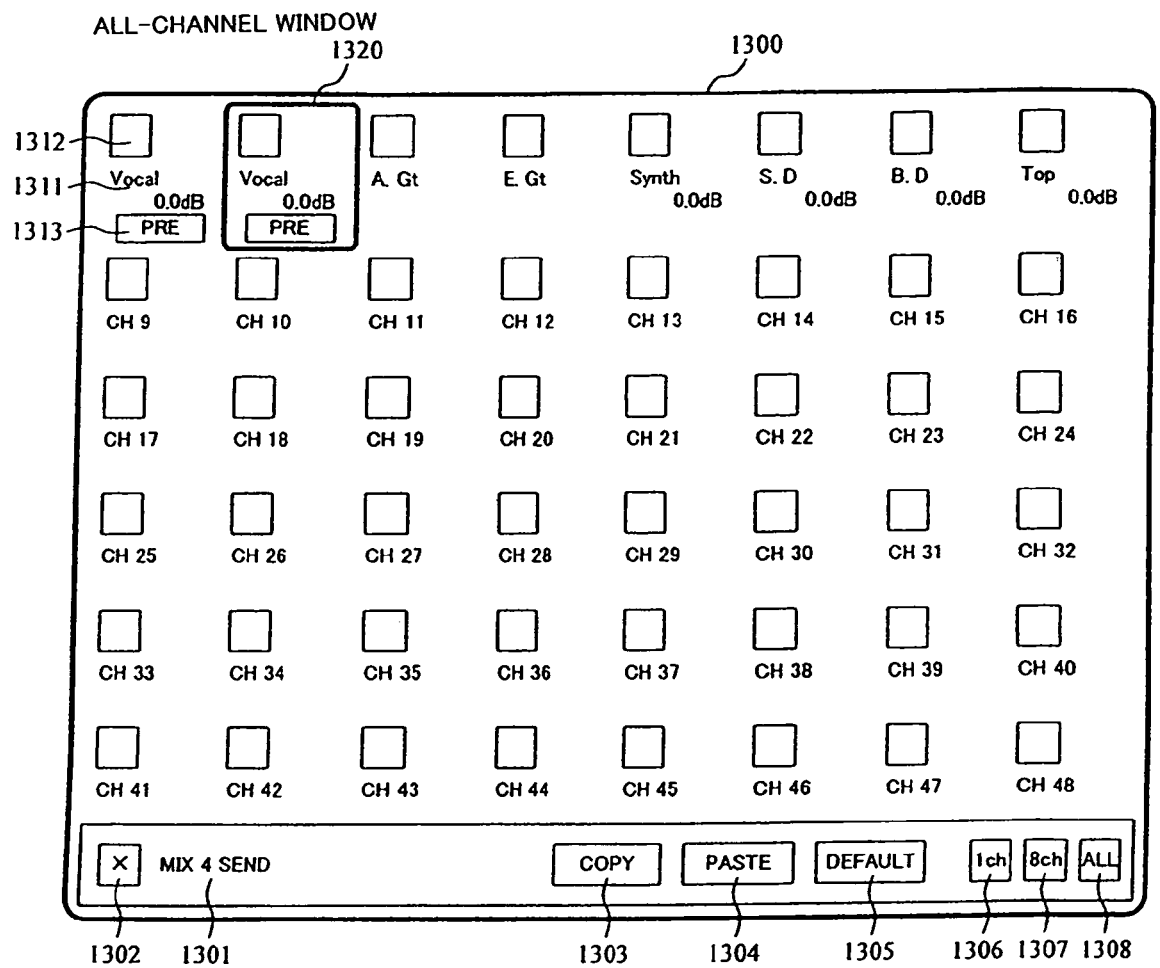
FIG. 13 is a diagram showing another example of the all-channel window.

FIGS. 12A, 12B and 13 show all-channel windows of the parameter windows, each of which can not be opened directly from the base screen but is openable in response to touching of the ALL button on the one-channel or eight-channel window.

FIG. 12A shows an example of the all-channel window 1200 related to DYNAMICS1, where are displayed icons 1212 and names 1211 of all of the 1st-48th channels (channel names too may be displayed simultaneously) and graphic representation 1213 (which may be replaced with numerical value representation) of a representative parameter of DYNAMICS1. Once a portion of a display area for a desired one of the channels is touched, a cursor 1220 is set to the desired channel.

In a lower end portion of the window of FIG. 12A, there are displayed the parameter name 1201, close button 1202, copy button 1203, paste button 1204, default button 1205, 1-ch button 1206, 8-ch button 1207 and ALL button 1208 (this ALL button 1208 is kept in a darkened or gray-out display state and thereby prevented from being manipulated). In generally the same manner as described above in relation to the above-described eight-channel window, a parameter of DYNAMICS1 of a desired one of the channels can be copied and pasted to another one of the channels via the cursor 1220, copy button 1203 and PASTE button 1204. Further, in generally the same manner as described above in relation to the above-described eight-channel window, a parameter of DYNAMICS1 of a desired one of the channels can be returned to a default via the default button 1205. Furthermore, as with the other parameter windows, a switchover can be made to a one-channel window or eight-channel window via the 1-ch button 1206 or 8-ch button 1207.

FIG. 12B shows an example of the all-channel window 1230 related to ATT/HPF/EQ, where are displayed icons 1242 and names 1241 of all of the 1st-48th channels, graphic representation 1243 of a representative parameter similar to those on the all-channel window of FIG. 12A. Here, an EQ setting is displayed in a graph as the representative parameter. Elements 1231-1238 displayed in a lower end portion of the window correspond to the elements 1201-1208 of FIG. 12A and have similar functions to the elements 1201-1208.

FIG. 13 shows an example of the all-channel window 1300 for MIX4SEND (i.e., send level to the 4th MIX bus). Here, icons 1312 and names 1311 of all of the 1st-48th channels and indication 1313 of a representative parameter are similar to those of FIG. 12A or 12B. Here, a send level from the channel in question to the 4th MIX bus is displayed in a numerical value, as the representative parameter. Elements 1301-1308 displayed in a lower end portion of the window correspond to the elements 1201-1208 of FIG. 12A and have similar functions to the elements 1201-1208.

For any given parameter, switching can be made among the one-channel window, eight-channel window and all-channel window via the 1-ch button, 8-channel button and ALL button, as noted above. Further, once a channel where the cursor is currently set is again touched on the all-channel window, a switchover can be made to a corresponding eight-channel window. Further, once a channel where the cursor is currently set is again touched on the eight-channel window, a switchover can be made to a corresponding one-channel window.

On the one-channel window, detailed parameter setting can be performed for a given one of the channels. On the eight-channel window, representative parameters of eight channels can be referred to or set in a parallel manner. On the all-channel window, representative parameters of all of the channels can be referred to. For example, a parameter of DYNAMICS1 can be copied and pasted between desired two of the channels. Further, on the one-channel window or eight-channel window, it is possible to designate the ON/OFF state of the function of a signal processing element of each of the channels. Whereas the encoders 536-1 536-8 have been described as made non-operable on the all-channel window, arrangements may be made, for example, to permit a representative parameter change for a designated group of eight channels via the encoders 536-1 536-8.

Figure 14:
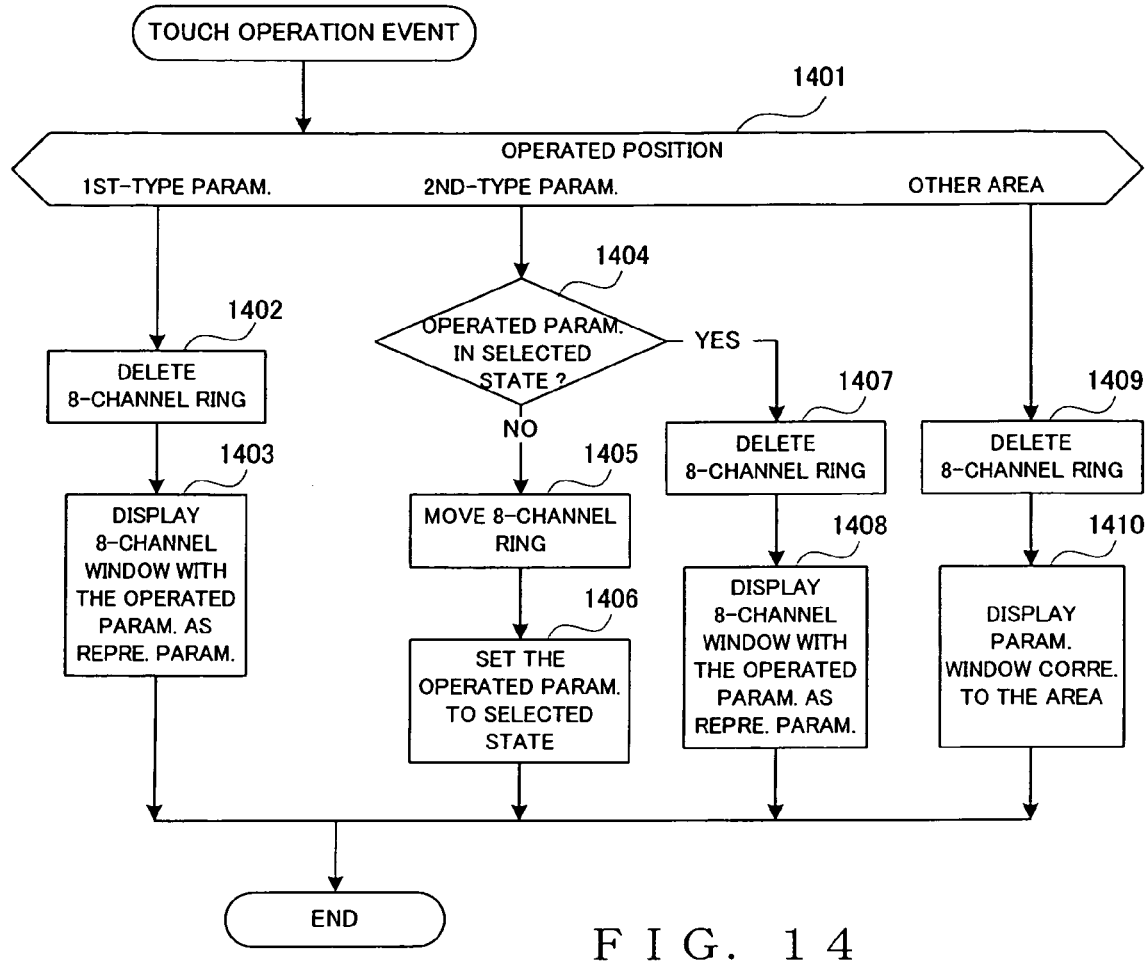
FIG. 14 is a flow chart of touch screen processing on the eight channel strip screen.

FIG. 14 is a flow chart of touch screen processing on the eight channel strip screen (FIG. 6). This processing is started up in response to touching (touch operation), by the human operator, of a given position on the eight channel strip screen. At step 1401, a determination is made as to whether the touch-operated position is in a display area of a first-type parameter or second-type operator or in another display area; if the operated position is a position of some button, a process corresponding to the operated button is carried out and then the processing is brought to an end, although not specifically shown in FIG. 14. If the touch-operated position is in a display area of a first-type parameter, i.e. if the touch-operated parameter (i.e., selected parameter) is a first-type parameter as determined at step 1401, the eight-channel ring is deleted at step 1402, and an eight-channel window with the touch-operated parameter as a representative parameter is displayed at step 1403. If the touch-operated parameter is a second-type parameter, then it is further determined at step 1404 whether the touch-operated parameter is currently in the selected state. If the touch-operated parameter is not currently in the selected state, the eight-channel ring is moved from the last-selected parameter, at which the eight-channel ring has so far been set, to the position of the current touch-operated parameter. At next step 1406, the current touch-operated parameter is set to the selected state, while the last-selected parameter is set to the non-selected state. If the current touch-operated parameter was already in the selected state at the time of the touching operation, then the eight-channel ring is deleted at step 1407, and an eight-channel window with the touch-operated parameter as a representative parameter is displayed at step 1408. Further, if the position touch-operated is in another display area as determined at step 1401, the eight-channel ring is deleted at step 1409, and a parameter window corresponding to the other display area is displayed at step 1410.

FIG. 15A is a flow chart of eight-channel encoder processing, which is started up in response to operation, by the human operator, of any one of the eight operators (encoders) 536-1-536-8 provided in a lower portion of the displayed screen. At step 1501, a determination is made as to whether or not any parameter window is currently displayed. If no parameter window is currently displayed as determined at step 1501, the processing goes to step 1502, where the value of the parameter, currently in the selected state, of the channel corresponding to the operated encoder is changed in accordance with the operation of the encoder. At following step 1503, a further determination is made as to whether the parameter is currently displayed. If answered in the affirmative (i.e., with a YES determination) at step 1503, the display is updated at step 1504, and then the processing is brought to an end. If answered in the negative at step 1503, the processing is immediately brought to an end without performing any further operation. If any parameter window is currently displayed as determined at step 1501, the value of the parameter corresponding to the encoder, displayed on the window, is changed, at step 1505, in accordance with the operation of the encoder. After that, the display is updated at step 1506, and then the processing is brought to an end.

FIG. 15B is a flow chart of selected-channel encoder processing, which is started up when the human operator has operated any one of the operators (encoders) in the parameter operation section 422 of FIG. 5A while the selected channel screen of FIG. 7 is being displayed. At step 1511, the value of the parameter corresponding to the operated encoder of the currently-selected channel is changed in accordance with the operation of the encoder. If the parameter corresponding to the operated encoder is currently displayed as determined at following step 1512, the display is updated at step 1513, and then the processing is brought to an end. If the parameter corresponding to the operated encoder is not currently displayed, the processing is immediately brought to an end without performing any further operation.

FIG. 16 is a flow chart of touch screen processing on the selected channel screen. This processing is started up in response to touching operation, by the human operator, of a given position on the selected channel screen of FIG. 7. At step 1601, the touch-operated position is checked. If the touch-operated position is an ON/OFF button, the ON/OFF state of the parameter in question of the selected channel is inverted at step 1602, the display is updated at step 1603, and then the processing is brought to an end. If the touch-operated position is in an area for an AUX parameter (e.g., knob in the partial display area 701), an eight-channel window (FIG. 11) with the AUX parameter as a representative parameter is displayed at step 1604, and then the processing is brought to an end. If the touch-operated position is in a parameter area other than that of an AUX parameter, a one-channel window with the parameter in question as a representative parameter is displayed at step 1605, and then the processing is brought to an end. Further, if the touch-operated position is in another area, a parameter window corresponding to the other area is displayed at step 1606, and then the processing is brought to an end.

Figure 17:
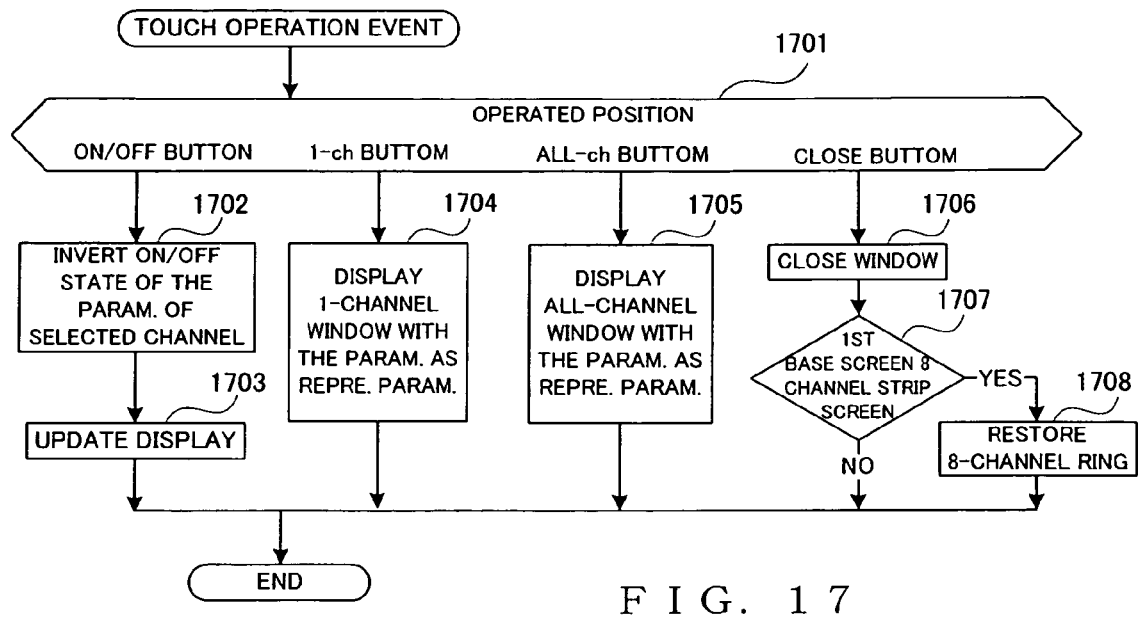
FIG. 17 is a flow chart of touch screen processing on the eight-channel window.

FIG. 17 is a flow chart of touch screen processing on the eight-channel window (FIG. 10 or 11). This processing is started up when touch operation has been performed by the human operator on the eight-channel window. Note that illustration of a process for moving the cursor and processes responsive to operation of the copy button, paste button and default button is omitted from FIG. 17. First, at step 1701, the touch-operated position is determined. If the touch-operated position is the ON/OFF button, the ON/OFF state of the parameter corresponding to the operated button is inverted at step 1702, the display is updated at step 1703, and then the processing is brought to an end. If the tough-operated position is a 1-ch button, a one-channel window with the parameter in question as a representative parameter is displayed at step 1704 (the eight-channel window is erased), and then the processing is brought to an end. Further, if the tough-operated position is an ALL button, an all-channel window with the parameter in question as a representative parameter is displayed at step 1705, and then the processing is brought to an end. Furthermore, if the tough-operated position is a close button, the window is closed at step 1706, and then a determination is made at step 1707 as to whether the base screen is the eight channel strip screen. If so, the eight-channel ring is restored at step S1708, and then the processing is brought to an end. If the base screen is the selected channel screen, the processing is immediately brought to an end without performing any further operation.

Touch screen processing on the one-channel window or all-channel window is similar to the above-described.

Whereas the embodiment has been described in relation to the case where one touch of a second-type parameter causes the parameter to be set to the selected state and two touches of the second-type parameter causes a parameter window to be opened, such arrangements are not necessarily essential. For example, arrangements may be made such that touching a parameter without depressing a SHIFT key causes a parameter window to be opened irrespective of whether the parameter is a first-type parameter or a second-type parameter and that touching a parameter while depressing the SHIFT key causes the parameter to be set to the selected state only if the parameter is a second-type parameter.

Further, whereas the embodiment has been described as handling eight channels as a predetermined set of channels, the predetermined set of channels may comprise any other number of channels than eight channels. Further, whereas the embodiment has been described as handling the ATT/HPF/EQ together on the parameter window, the ATT, HPF and EQ may be handled separately from one another.

In an alternative, a window corresponding to a currently-opened screen (i.e., selected channel screen or k (eight) channel strip screen) needs not necessarily be opened in response to representative parameter selection operation. For example, it may be determined in advance, for each selected parameter, which of the one-channel window and k (eight-channel) window should be opened. For example, it is only necessary that operators for switching among the one-channel window, k (eight-channel) window and all-channel window be provided to permit switching among these windows.

Whereas the embodiment has been described as displaying, within the partial display areas of the strip screen of FIG. 6, single downward-pointing triangular marks each indicative of a first-type parameter and double downward-pointing triangular marks each indicative of a second-type parameter, such indications of the first-type and second-type parameters may be in any other appropriate form than by the display of the triangular marks. Alternatively, the first-type and second-type parameters may be displayed in non-visually-distinguishable form with the visual indications by the triangular marks or the like omitted.

What is claimed is:

1. A digital mixer including a plurality m of signal processing channels, each of the signal processing channels processing an audio signal in accordance with parameters set for the signal processing channel, the parameters set for each of the channels including first-type parameters and second-type parameters, said digital mixer comprising:

a display device capable of displaying graphics;
a plurality k of controls operable by a user, where k<m;
a first display control section that, in response to a first selection operation by the user, selects k channels from among the m signal processing channels, and causes said display device to display a channel strip screen displaying a plurality of parameters for each of selected k channels, wherein k second-type parameters, of a function common to the selected k channels, among the parameters displayed on the channel strip screen, are in a selected state, and parameters other than the k second-type parameters are in a non-selected state;
a second display control section that, in response to a second selection operation to select a desired one of the parameters displayed on the channel strip screen by the user, opens a parameter window related to the selected parameter over the channel strip screen, said parameter window displaying, for each of selected k channels, parameters related to the selected parameter, wherein,
(1) when the second selection operation selects a first-type parameter, the second display control section opens the parameter window related to the selected first-type parameter, (2) when the second selection operation selects a second-type parameter in the non-selected state, the second display control section sets k second-type parameters at the same position as the selected second-type parameter into the selected state without opening the parameter window, and (3) when the second selection operation selects a second-type parameter in the selected state, the second display control section opens the parameter window related to the selected second-type parameter;

an assignment section that, (1) when no parameter window is opened over the channel strip screen, assigns each of the k second-type parameters in the selected state, displayed on the channel strip screen, to each of the k controls, and (2) when a parameter window is opened over the channel strip screen, assigns each of k parameters, displayed on the parameter window, to each of the k controls; and a parameter control section that, in response to a setting operation on any of the k controls by the user, sets a value of the parameter currently assigned to the operated control.

2. A digital mixer as claimed in claim 1, wherein said first-type parameters and second-type parameters are displayed on the channel strip screen in mutually-different forms.

3. A digital mixer as claimed in claim 1, wherein said display device is a touched-position-detection type display device capable of detecting a touched position on a display screen thereof, and the selection operation is performed by touching operation, by a user, on any one of display areas for individual parameters on the channel strip screen displayed on said display device.

4. A digital mixer as claimed in claim 1, wherein, in response to selection operation to select any one of the second-type parameter, currently in the non-selected state, of a given one of the channels displayed on the channel strip screen, second-type parameters, similar to the selected second-type parameter, of all of the k channels are each set to the selected state and visually indicated as having been set to the selected state.

5. A digital mixer as claimed in claim 1, wherein said display device is provided on an operation panel of said digital mixer, and the k controls are arranged along one side of said display device in front of said display device on the operation panel.

6. A digital mixer as claimed in claim 1, wherein a visual indication of each of the second-type parameters on the channel strip screen is accompanied by an image of an operator.

7. A digital mixer as claimed in claim 1, further comprising a window-switching control section that, in accordance with a window switching instruction, closes a currently-opened parameter window and opens a parameter window of a designated other type, wherein the parameter window of the designated other type parameter window includes at least one of a one-channel window that displays, for a selected one of the channels, k or less parameters belonging to a same group as the selected desired parameter, each of the selected parameters being assignable to any one of predetermined k controls in said channel strip section, and an all-channel window that displays parameters for all of the channels.

8. A display control method for a digital mixer including:
a plurality m of signal processing channels; a display device capable of displaying graphics; and a plurality k of controls operable by a user, where k<m, each of the signal processing channels processing an audio signal in accordance with parameters set for the signal processing channel, the parameters set for each of the channels including first-type parameters and second-type parameters, said method comprising:

a first display control step of, in response to a first selection operation by the user, selecting k channels from among the m signal processing channels, and causing said display device to display a channel strip screen displaying a plurality of parameters for each of selected k channels, wherein k second-type parameters, of a function common to the selected k channels, among the parameters displayed on the channel strip screen, are in a selected state, and parameters other than the k second-type parameters are in a non-selected state;

a second display control step of, in response to a second selection operation to select a desired one of the parameters displayed on the channel strip screen by the user, opening a parameter window related to the selected parameter over the channel strip screen, said parameter window displaying, for each of selected k channels, parameters related to the selected parameter, wherein, (1) when the second selection operation selects a first-type parameter, the second display control step opens the parameter window related to the selected first-type parameter, (2) when the second selection operation selects a second-type parameter in the a non-selected state, the second display control step sets k second-type parameters at the same position as the selected second-type parameter into the selected state without opening the parameter window, and (3) when the second selection operation selects a second-type parameter in the selected state, the second display control step opens the parameter window related to the selected second-type parameter;

a step of, (1) when no parameter window is opened over the channel strip screen, assigning each of the k second-type parameters in the selected state, displayed on the channel strip screen, to each of the k controls, and (2) when a parameter window is opened over the channel strip screen, assigns each of k parameters, displayed on the parameter window, to each of the k controls; and a step of, in response to a setting operation on any of the k controls by the user, setting a value of the parameter currently assigned to the operated control.

9. A digital mixer including a plurality m of signal processing channels, each of the signal processing channels processing an audio signal in accordance with parameters set for the signal processing channel, the parameters set for each of the channels including first-type parameters and second-type parameters, said digital mixer comprising:

a display device capable of displaying graphics;
a plurality k of controls operable by a user;
a first display control section that (a), in response to a first selection operation by the user, selects a channel from among the m signal processing channels and causes said display device to display, as a base screen, a selected channel screen displaying a plurality of parameters for a selected one of the channels and that (b), in response to a second selection operation by the user, selects k channels from among the m signal processing channels and causes said display device to display, as a base screen, a channel strip screen displaying a plurality of parameters for each of the selected k channels, wherein k second-type parameters, of a function common to the selected k channels, among the parameters displayed on the channel strip screen, are in a selected state, and parameters other than the k second-type parameters are in a non-selected state;

a second display control section that, in response to a third selection operation by the user, selects one of the parameters displayed on the base screen and opens one of a plurality of types of parameter windows relating to the selected parameter over the base screen, said plurality of types of parameter windows relating to the selected parameter including (a) a one-channel window that displays, for a selected one of the channels, k or less parameters belonging to a same group as the selected desired parameter, each of the k or less parameters corresponding to each of said plurality of controls, and (b) a k-channel window that displays, for each of selected k channels, a parameter of a same type as the selected parameter, each of the parameters for the k channels corresponding to each of said plurality of controls;

a window-switching control section that, in accordance with a window switching instruction by the user, closes a currently-opened one type of parameter window related to the selected parameter and opens another type of a parameter window related to the selected parameter;

an assignment section that (a) when no parameter window is opened over the base screen, assigns each of the k parameters, being in the selected state in said channel strip window, to each of the k controls, and (b) when a parameter window is opened over the base screen, assigns each of the parameters, displayed on the parameter window, to the corresponding one of the k controls; and a parameter control section that, in response to a setting operation on any of the k controls by the user, controls a value of the parameter currently assigned to the operated control.

10. A digital mixer as claimed in claim 9, wherein said second display control section controls the window opening so that, when the selected channel screen is being displayed as the base screen, the one-channel window is opened in response to the selection operation, but, when the channel strip screen is being displayed as the base screen, the k-channel window is opened in response to the selection operation.

11. A digital mixer as claimed in claim 9, wherein said display device is a touched-position-detection type display device capable of detecting a touched position on a display screen thereof, and the selection operation is performed by touching operation, by the user, on any one of display areas for individual parameters on the base screen displayed on said display device.

12. A digital mixer as claimed in claim 9, wherein the window switching instruction can give an instruction for switching over to a parameter window of a desired type, irrespective of a type of the base screen currently displayed, and said window-switching control section switches a display screen of said display device to a parameter window of a type instructed by the given window switching instruction, irrespective of the type of the base screen currently displayed.

13. A digital mixer as claimed in claim 9, wherein said plurality of types of parameter windows further include an all-channel window that displays parameters for all of the channels, the window switching instruction can give an instruction for switching the display screen to any one of the one-channel window, k-channel window and all-channel window, irrespective of a type of the base screen currently displayed, and said window-switching control section switches the display screen to any one of the one-channel window, k-channel window and all-channel window, irrespective of the type of the base screen currently displayed.

14. A digital mixer as claimed in claim 9, wherein an image of a window switching button operable when a switchover is to be made to a desired type of parameter window is displayed on each of the types of parameter windows, and the window switching instruction for instructing a switchover to a desired type of parameter window is generated by the user operating the image of the window switching button.

15. A digital mixer as claimed in claim 9, wherein said display device is provided on an operation panel of said digital mixer, and said plurality of controls are arranged along one side of said display device in front of said display device on the operation panel.

16. A digital mixer as claimed in claim 9, wherein, when channel assignment to said controls has been changed by said assignment section in accordance with selection by the user, said first display control section causes the channel strip screen to be displayed as the base screen.

17. A digital mixer as claimed in claim 9, further comprising a parameter control section including controls for setting various parameters for one of the channels, and wherein, when channel selection operation to select use of said parameter control section for a particular one of the channels has been performed by the user, said first display control section causes the selected channel screen to be displayed as the base screen.

18. A digital mixer as claimed in claim 9, wherein the number of said plurality of signal processing channels is m, where m>k, wherein said plurality of controls are included in a channel strip section which includes channel strips provided in corresponding relation to k channels, each of the channel strips including at least one of said plurality of controls to be used for performing parameter setting for a corresponding one of the channels, and wherein said assignment section assigns k channels, selected from among the m channels, to individual one of the channel strips of said channel strip section.

19. A display control method for a digital mixer including: a plurality m of signal processing channels; and a display device capable of displaying graphics; a plurality k of controls operable by a user, each of the signal processing channels processing an audio signal in accordance with parameters set for the signal processing channel, the parameters set for each of the channels including first-type parameters and second-type parameters, said method comprising:

a step of (a), in response to a first selection operation by the user, selecting a channel from among the m signal processing channels and causing said display device to display, as a base screen, a selected channel screen displaying a plurality of parameters for a selected one of the channels, and (b), in response to a second selection operation by the user, selecting k channels from among the m signal processing channels and causing said display device to display, as a base screen, a channel strip screen displaying a plurality of parameters for each of selected k channels, wherein k second-type parameters, of a function common to the selected k channels, among the parameters displayed on the channel strip screen, are in a selected state, and parameters other than the k second-type parameters are in a non-selected state;

a step of, in response to a third selection operation by the user, selecting one of the parameters displayed on the base screen and opening one of a plurality of types of parameter windows relating to the selected parameter over the base screen, said plurality of types of parameter windows relating to the selected parameter including (a) a one-channel window that displays, for a selected one of the channels, k or less parameters belonging to a same group as the selected desired parameter, each of the k or less parameters corresponding to each of said plurality of controls, and (b) a k-channel window that displays, for each of selected k channels, a parameter of a same type as the selected parameter, each of the parameters for the k channels corresponding to each of said plurality of controls;

a step of, in accordance with a window switching instruction by the user, closing a currently-opened one type of parameter window related to the selected parameter and opening another type of parameter window related to the selected parameter;

a step of, (a) when no parameter window is opened over the base screen, assigning each of the k parameters, being in the selected state in said channel strip window, to each of the k controls, and (b) when a parameter window is opened over the base screen, assigning each of the parameters, displayed on the parameter window, to the corresponding one of the k controls; and a step of, in response to a setting operation on any of the k controls by the user, controlling a value of the parameter currently assigned to the operated control.

20. A computer-readable storage medium containing a group of instructions for causing a computer to perform a display control method in a digital mixer including: a plurality m of signal processing channels; a display device capable of displaying graphics; and a plurality k of controls operable by a user, where k<m, each of the signal processing channels processing an audio signal in accordance with parameters set for the signal processing channel, the parameters set for each of the channels including first-type parameters and second-type parameters, said method comprising:

a first display control step of, in response to a first selection operation by the user, selecting k channels from among the m signal processing channels, and causing said display device to display a channel strip screen displaying a plurality of parameters for each of selected k channels, wherein k second-type parameters, of a function common to the selected k channels, among the parameters displayed on the channel strip screen, are in a selected state, and parameters other than the k second-type parameters are in a non-selected state;

a second display control step of, in response to a second selection operation to select a desired one of the parameters displayed on the channel strip screen by the user, opening a parameter window related to the selected parameter over the channel strip screen, said parameter window displaying, for each of selected k channels, parameters related to the selected parameter, a first-type parameter, the second display control step opens the parameter window related to the selected first-type parameter, (2) when the second selection operation selects a second-type parameter in the non-selected state, the second display control step sets k second-type parameters at the same position as the selected second-type parameter into the selected state without opening the parameter window, and (3) when the second selection operation selects a second-type parameter in the selected state, the second display control step opens the parameter window related to the selected second-type parameter;

a step of, (1) when no parameter window is opened over the channel strip screen, assigning each of the k second-type parameters in the selected state, displayed on the channel strip screen, to each of the k controls, and (2) when a parameter window is opened over the channel strip screen, assigns each of k parameters, displayed on the parameter window, to each of the k controls; and a step of, in response to a setting operation on any of the k controls by the user, setting a value of the parameter currently assigned to the operated control.

21. A computer-readable storage medium containing a group of instructions for causing a computer to perform a display control method in a digital mixer including: a plurality m of signal processing channels; and a display device capable of displaying graphics; a plurality k of controls to be operated by a user, each of the signal processing channels processing an audio signal in accordance with parameters set for the signal processing channel, the parameters set for each of the channels including first-type parameters and second-type parameters, said method comprising:

a step of (a), in response to a first selection operation by the user, selecting a channel from among the m signal processing channels and causing said display device to display, as a base screen, a selected channel screen displaying a plurality of parameters for a selected one of the channels, and (b), in response to a second selection operation by the user, selecting k channels from among the m signal processing channels and causing said display device to display, as a base screen, a channel strip screen displaying a plurality of parameters for each of the selected k channels, wherein k second-type parameters, of a function common to the selected k channels, among the parameters displayed on the channel strip screen, are in a selected state, and parameters other than the k second-type parameters are in a non-selected state;

a step of, in response to a third selection operation by the user, selecting one of the parameters displayed on the base screen and opening one of a plurality of types of parameter windows relating to the selected parameter over the base screen, said plurality of types of parameter windows relating to the selected parameter including (a) a one-channel window that displays, for a selected one of the channels, k or less parameters belonging to a same group as the selected desired parameter, each of the k or less parameters corresponding to each of said plurality of controls, and (b) a k-channel window that displays, for each of selected k channels, a parameter of a same type as the selected parameter, each of the parameters for the k channels corresponding to each of said plurality of controls;

a step of, in accordance with a window switching instruction by the user, closing a currently-opened one type of parameter window related to the selected parameter and opening another type of parameter window related to the selected parameter;

a step of, (a) when no parameter window is opened over the base screen, assigning each of the k parameters, being in the selected state in said channel strip window, to each of the k controls, and (b) when a parameter window is opened over the base screen, assigning each of the parameters, displayed on the parameter window, to the corresponding one of the k controls; and a step of, in response to a setting operation on any of the k controls by the user, controlling a value of the parameter currently assigned to the operated control.

* * * * *